US008825299B2

(12) United States Patent
Iwamoto et al.

(10) Patent No.: US 8,825,299 B2
(45) Date of Patent: Sep. 2, 2014

(54) CONTROL SYSTEM AND ELECTRIC POWER STEERING CONTROL DEVICE

(75) Inventors: Keisuke Iwamoto, Kobe (JP); Yuji Takatsuka, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/699,192

(22) PCT Filed: Sep. 30, 2010

(86) PCT No.: PCT/JP2010/067036
§ 371 (c)(1),
(2), (4) Date: Nov. 20, 2012

(87) PCT Pub. No.: WO2012/042629
PCT Pub. Date: Apr. 5, 2012

(65) Prior Publication Data
US 2013/0066523 A1    Mar. 14, 2013

(51) Int. Cl.
*G06F 17/00* (2006.01)
*G06F 19/00* (2011.01)
*B62D 6/00* (2006.01)
*B62D 6/08* (2006.01)

(52) U.S. Cl.
USPC .............. 701/41; 701/70; 701/76; 340/932.2

(58) Field of Classification Search
USPC ............. 701/1, 36, 41, 43, 48, 70, 71, 72, 76, 701/78, 79, 82, 83, 91, 92, 93, 96, 97, 29.1, 701/29.2, 29.7, 30.3, 30.5, 30.7, 30.9, 31.1, 701/32.7, 32.8, 33.6, 33.7, 33.8, 33.9, 34.1, 701/34.3, 34.4; 340/901, 903, 425.5, 435, 340/436, 438, 439, 444, 932.2

See application file for complete search history.

(56) References Cited

U.S. PATENT DOCUMENTS

| 7,431,117 | B2 * | 10/2008 | Ito ................................. 180/204 |
| 8,265,829 | B2 | 9/2012 | Matsushita et al. |
| 2005/0234614 | A1 | 10/2005 | Sakurai et al. |
| 2009/0143942 | A1 | 6/2009 | Matsushita et al. |

FOREIGN PATENT DOCUMENTS

| EP | 1 149 754 A2 | 10/2001 |
| EP | 1 729 419 A1 | 12/2006 |
| JP | 1-218929 A | 9/1989 |
| JP | 5-97043 A | 4/1993 |

(Continued)

*Primary Examiner* — Thomas Tarcza
*Assistant Examiner* — Edward Pipala
(74) *Attorney, Agent, or Firm* — Sughrue Mion, PLLC; Richard C. Turner

(57) ABSTRACT

A main control device generates a first signal and a second signal, which is substantially equivalent to the first signal, in accordance with the input signal, a sub-control device includes a comparison-judgment-processing unit that compares the first signal with the second signal, and judges that an abnormality occurs when a state, in which a deviation between the both signals is greater than equal to a predetermined value, is continued in a time being equal to a first predetermined time, and a limitation unit is configured in such a way that the limitation unit adds a predetermined limitation to the output of the main control device in accordance with a result for which the comparison-judgment-processing unit judges that the abnormality occurs.

5 Claims, 23 Drawing Sheets

(56) References Cited

FOREIGN PATENT DOCUMENTS

| | | |
|---|---|---|
| JP | 7-40848 A | 2/1995 |
| JP | 10-211885 A | 8/1998 |
| JP | 2001-056701 A | 2/2001 |
| JP | 2001-310743 A | 11/2001 |
| JP | 2005-306124 A | 11/2005 |
| JP | 2009-132281 A | 6/2009 |
| WO | 2005/086355 A1 | 9/2005 |

* cited by examiner

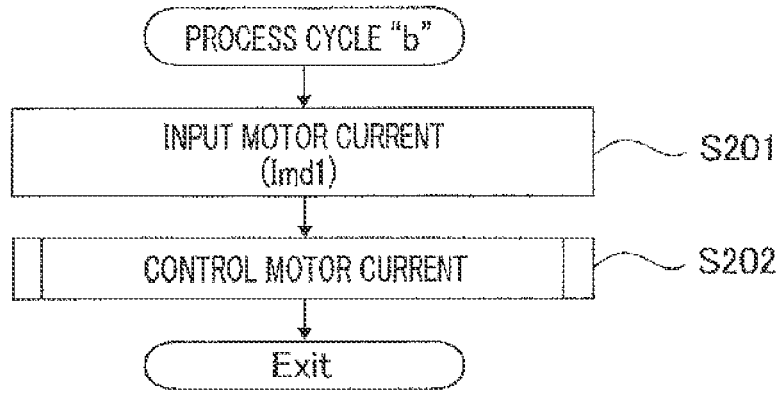
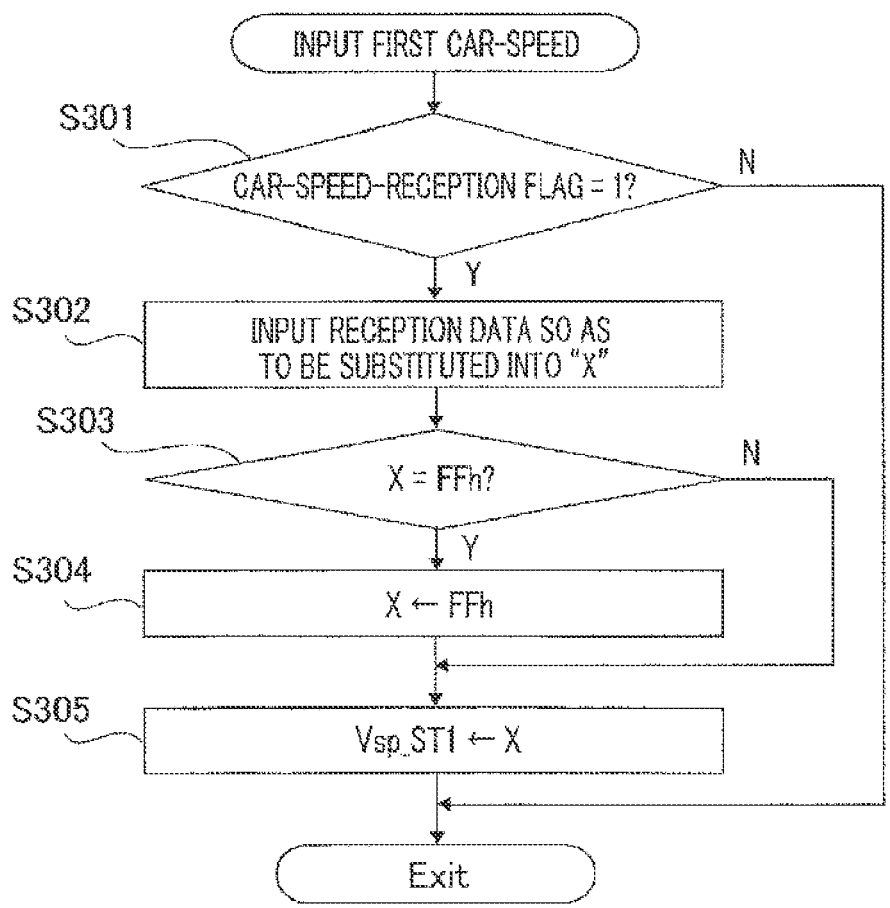

CONTROL SYSTEM AND ELECTRIC POWER STEERING CONTROL DEVICE

BACKGROUND OF THE INVENTION

1. Technical Field

The present invention relates to a control system including a main control device and a sub-control device for monitoring an operational state of the main control device, and relates to an electric power steering control device using the control system.

2. Background Art

As known in a conventional art, an electric power steering control device is explained as a system by which steering power of a power is reduced by using driving power for a motor, which is used as auxiliary power. However, a microcomputer is used for controlling the motor, and abnormal auxiliary power is generated when an abnormality occurs in the microcomputer, and the auxiliary power is objectionable for a safety operation. Therefore, a reliability of the microcomputer becomes more important, and a countermeasure for the reliability of the microcomputer, by which safety is ensured even when the microcomputer is abnormally operated, is implemented.

In order to realize control systems used for the above-described electric power steering control device, a conventional control system is suggested, in which a microcomputer operated as a main control device and a sub-control device for monitoring an operational state of the main computer are included, and when the operation state of the main computer is abnormal, the sub-control device detects the abnormality so as to stop the operation of the main control device.

For example, the conventional control system described in Japanese Laid-Open Patent Publication No. 2009-132281 includes a main computing device connected to an in-car LAN, a sub-computing device connected to the in-car LAN, and a communication device for communicating between the main computing device and the sub-computing device, and then, the sub-computing device detects an abnormality of the main computing device by comparing information transmitted from the main computing device via the communication device with information obtained from the in-car LAN.

CONVENTIONAL ART DOCUMENT

Patent Document

[Patent Document 1]
Japanese Laid-Open Patent Publication No. 2009-132281

SUMMARY OF THE INVENTION

Problems to be Solved by the Invention

In the conventional control system disclosed in Patent Document 1, there have been problems in that an in-car LAN must be connected to a main computing device and a sub-computing device, so that a LAN communication circuit must be also provided in the sub-computing device, whereby a cost of the conventional control system is increased.

The present invention has been made to solve the above-described problems of a conventional device, and an object of the invention is to provide a control system in which a LAN communication circuit must not be provided in a sub-control device, and a sub control device, by which a main control device can be monitored by a cheap configuration, is included.

Moreover, anther object of the invention is to provide a cheap and highly reliable electric power steering control device in which a sub control device, by which a main control device can be monitored by a cheap configuration, is included, and a LAN communication circuit must not be provided in the sub-control device.

Means for Solving Problems

A control system of the present invention includes a main control device that generates output for controlling a controlled object in accordance with an input signal; a sub-control device for monitoring an operating state of the main control device; a communication-processing unit for communicating between the main control device and the sub-control device; and a limitation unit for limiting the output of the main control device in accordance with the monitoring by the sub-control device; wherein the main control device includes a first signal-processing unit that generates a first signal, for generating the output, in accordance with the input signal, and a second signal-processing unit that generates a second signal, which is substantially equivalent to the first signal, in accordance with the input signal; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which a deviation between the both signals is greater than equal to a predetermined value, is continued in a time being equal to a first predetermined time; and the limitation unit is configured in such a way that the limitation unit adds a predetermined limitation to the output of the main control device in accordance with a result for which the comparison-judgment-processing unit judges that the abnormality occurs.

Moreover, a control system of the present invention includes a main control device that generates output for controlling a controlled object in accordance with an input signal; a sub-control device for monitoring an operating state of the main control device; a communication-processing unit for communicating between the main control device and the sub-control device; and a limitation unit for limiting the output of the main control device in accordance with the monitoring by the sub-control device; wherein the main control device includes a first signal-processing unit that generates a first signal, which is used for generating the output, in accordance with the input signal, a second signal-processing unit that generates a second signal, which is substantially equivalent to the first signal, in accordance with the input signal, and an initialization-processing unit that periodically initializes the second signal; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which a deviation between the both signals is greater than equal to a predetermined value, is continued in a time being longer than or equal to a first predetermined time, an initialization-judgment-processing unit that judges that an abnormality occurs when a state, in which the second signal is not initialized by the initialization-processing unit, is continued in a time being longer than or equal to a second predetermined time, and an abnormality-judging unit that judges that an abnormality occurs when at least one of the comparison-judgment-processing unit and the initialization-judgment-processing unit judges that the abnormality occurs; and the limitation unit is configured in such a way that the limitation unit adds a predetermined limitation to the output of the main control device, when the abnormality-judging unit judges that the abnormality occurs. In the control system of the present invention, it is desirable that the initialization-processing unit is configured in such a way that the initialization-processing unit initializes the second signal, after the communication-processing unit performs the transmission; and a process cycle of the second signal-processing unit is defined to be longer than an initialization cycle of the initialization-processing unit.

An electric power steering control device of the present invention includes a main control device that generates output for controlling a motor that generates a steering auxiliary torque corresponding to a steering torque applied by a driver; a sub-control device for monitoring an operating state of the main control device; a communication-processing unit for communicating between the main control device and the sub-control device; and a limitation unit for limiting the output of the main control device in accordance with the monitoring by the sub-control device; wherein a torque-detecting unit for detecting the steering torque applied by the driver and a motor-current-detecting unit for detecting a motor current passed through the motor are included; and the main control device includes a first car-speed-signal-processing unit that generates a first car-speed signal in accordance with a car-speed signal inputted from a car-speed sensor, a second car-speed-signal-processing unit that generates a second car-speed signal, which is substantially equivalent to the first car-speed signal, in accordance with the car-speed signal, a target-current-determination unit that determines a target current of the motor in accordance with at least the detected steering torque and the first car-speed-signal, and a motor-current-control unit that generates output for controlling the motor current in accordance with the determined target current; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which these signals are not equal to each other, is continued in a time being longer than or equal to a first predetermined time, a car-speed-judgment unit that judges that an abnormality occurs when the comparison-judgment-processing unit judges that the abnormality occurs, and a motor-current-abnormality-judging unit that judges that an abnormality occurs when a state, in which a current threshold is defined based on at least the detected steering torque, the first car-speed-signal, and a judgment result of the car-speed-judgment unit, and the detected motor-current value is greater than the current threshold, is continued in a time being longer than or equal to a third predetermined time; and the limitation unit is configured in such a way that the limitation unit adds a predetermined limitation to the output of the motor-current-control unit, when the motor-current-abnormality-judging unit judges that the abnormality occurs.

An electric power steering control device of the present invention includes a main control device that generates output for controlling a motor that generates a steering auxiliary torque corresponding to a steering torque applied by a driver; a sub-control device for monitoring an operating state of the main control device; a communication-processing unit for communicating between the main control device and the sub-control device; and a limitation unit for limiting the output of the main control device in accordance with the monitoring by the sub-control device; wherein a torque-detecting unit for detecting the steering torque applied by the driver and a motor-current-detecting unit for detecting a motor current passed through the motor are included; and the main control device includes a first car-speed-signal-processing unit that generates a first car-speed signal in accordance with a car-speed signal inputted from a car-speed sensor, a second car-speed-signal-processing unit that generates a second car-speed signal, which is substantially equivalent to the first car-speed signal, in accordance with the car-speed signal, a target-current-determination unit that determines a target current of the motor in accordance with at least the detected steering torque and the first car-speed-signal, a motor-current-control unit that generates output for controlling the motor current in accordance with the determined target current, and an initialization-processing unit that periodically initializes the second signal; and t エラー! リンクが正しくありません. In the electric power steering control device of the present invention, it is desirable that the current threshold is determined based on the detected steering torque, the first car-speed-signal, and a judgment result of the car-speed-judgment unit, and the current threshold is defined as a first current threshold when a judgment result by the car-speed-judgment unit is normal state and the first car-speed signal is lower than a predetermined value, and defined as a second current threshold when the judgment result by the car-speed-judgment unit is abnormal state, or the first car-speed signal is greater than or equal to the predetermined value, and moreover, the second current threshold is lower than the first current threshold.

In the electric power steering control device of the present invention, it is desirable that an automatic parking-control unit that outputs an automatic parking-control current for performing automatic parking control and an automatic parking control-command flag, which is turned on when the automatic parking control is executed and turned off when the automatic parking control is stopped; and an current-addition unit that adds the automatic parking-control current to the motor-target current so as to generate a new target current; wherein the current threshold is determined based on the detected steering torque, the first car-speed signal, a judgment result by the car-speed-judgment unit, and the automatic parking control-command flag, and the current threshold is defined as a first current threshold when a judgment result by the car-speed-judgment unit is normal state, and the first car-speed signal is lower than a predetermined value, and moreover, the automatic parking control-command flag is turned on, and defined as a second current threshold when the judgment result by the car-speed-judgment unit is abnormal state, or the first car-speed signal is greater than or equal to the predetermined value, or the automatic parking control-command flag is turned off, and moreover, the second current threshold is lower than the first current threshold.

Effects of the Invention

According to the control system of the present invention, the control system includes a main control device that generates output for controlling a controlled object in accordance with an input signal; a sub-control device for monitoring an operating state of the main control device; a communication-processing unit for communicating between the main control device and the sub-control device; and a limitation unit for limiting the output of the main control device in accordance with the monitoring by the sub-control device; wherein the main control device includes a first signal-processing unit that generates a first signal, for generating the output, in accordance with the input signal, and a second signal-processing unit that generates a second signal, which is substantially equivalent to the first signal, in accordance with the input signal; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which a deviation between the both signals is greater than equal to a predetermined value, is continued in a time being equal to a first predetermined time; and the limitation unit is configured in such a way that the limitation unit adds a predetermined limitation to the output of the main control device in accordance with a result for which the comparison-judgment-processing unit judges that the abnormality occurs, so that a LAN communication circuit must not be provided in a sub-control device, and a sub control device can be monitored by a cheap configuration.

Moreover, according to the control system of the present invention, the control system includes a main control device that generates output for controlling a controlled object in accordance with an input signal; a sub-control device for monitoring an operating state of the main control device; a communication-processing unit for communicating between the main control device and the sub-control device; and a limitation unit for limiting the output of the main control device in accordance with the monitoring by the sub-control device; wherein the main control device includes a first signal-processing unit that generates a first signal, which is used for generating the output, in accordance with the input signal, a second signal-processing unit that generates a second signal, which is substantially equivalent to the first signal, in accordance with the input signal, and an initialization-processing unit that periodically initializes the second signal; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which a deviation between the both signals is greater than equal to a predetermined value, is continued in a time being longer than or equal to a first predetermined time, an initialization-judgment-processing unit that judges that an abnormality occurs when a state, in which the second signal is not initialized by the initialization-processing unit, is continued in a time being longer than or equal to a second predetermined time, and an abnormality-judging unit that judges that an abnormality occurs when at least one of the comparison-judgment-processing unit and the initialization-judgment-processing unit judges that the abnormality occurs; and the limitation unit is configured in such a way that the limitation unit adds a predetermined limitation to the output of the main control device, when the abnormality-judging unit judges that the abnormality occurs, so that a LAN communication circuit must not be provided in a sub-control device, and a sub control device can be monitored by a cheap configuration, and an abnormality can be detected when the initialization process is stopped.

Moreover, according to an electric power steering control device of the present invention, the electric power steering control device includes a torque-detecting unit for detecting the steering torque applied by the driver and a motor-current-detecting unit for detecting a motor current passed through the motor are included; and the main control device includes a first car-speed-signal-processing unit that generates a first car-speed signal in accordance with a car-speed signal inputted from a car-speed sensor, a second car-speed-signal-processing unit that generates a second car-speed signal, which is substantially equivalent to the first car-speed signal, in accordance with the car-speed signal, a target-current-determination unit that determines a target current of the motor in accordance with at least the detected steering torque and the first car-speed-signal, and a motor-current-control unit that generates output for controlling the motor current in accordance with the determined target current; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which these signals are not equal to each other, is continued in a time being longer than or equal to a first predetermined time, a car-speed-judgment unit that judges that an abnormality occurs when the comparison-judgment-processing unit judges that the abnormality occurs, and a motor-current-abnormality-judging unit that judges that an abnormality occurs when a state, in which a current threshold is defined based on at least the detected steering torque, the first car-speed-signal, and a judgment result of the car-speed-judgment unit, and the detected motor-current value is greater than the current threshold, is continued in a time being longer than or equal to a third predetermined time; and the limitation unit is configured in such a way that the limitation unit adds a predetermined limitation to the output of the motor-current-control unit, when the motor-current-abnormality-judging unit judges that the abnormality occurs, so that a LAN communication circuit must not be provided in a sub-control device, and a sub control device can be monitored by a cheap configuration. Moreover, for example, when an automatic parking control, which functions at a very low speed, is performed, the motor-current threshold is expanded, the automatic parking control is enabled, the motor-current threshold is set at a value, by which the safety at the running can be ensured, when the automatic parking control is not performed, and the motor-current threshold is set at a value, by which the safety at the running can be ensured, when an abnormality occurs for the car-speed-input process in the main control unit, whereby the automatic parking control and the power steering control can be performed while the safety is ensured.

Moreover, according to an electric power steering control device of the present invention, the electric power steering control device includes a torque-detecting unit for detecting the steering torque applied by the driver and a motor-current-detecting unit for detecting a motor current passed through the motor are included; and the main control device includes a first car-speed-signal-processing unit that generates a first car-speed signal in accordance with a car-speed signal inputted from a car-speed sensor, a second car-speed-signal-processing unit that generates a second car-speed signal, which is substantially equivalent to the first car-speed signal, in accordance with the car-speed signal, a target-current-determination unit that determines a target current of the motor in accordance with at least the detected steering torque and the first car-speed-signal, a motor-current-control unit that generates output for controlling the motor current in accordance with the determined target current, and an initialization-processing unit that periodically initializes the second signal; and the communication-processing unit has a function of transmitting the first signal and the second signal from the main control device to the sub-control device; and the sub-control device includes a comparison-judgment-processing unit that compares the first signal with the second signal, which are transmitted from the main control device via the communication-processing unit, and judges that an abnormality occurs when a state, in which these signals are not equal to each other, is continued in a time being longer than or equal to a first predetermined time, an initialization-judgment-processing unit that judges that an abnormality occurs when a state, in which the second signal is not initialized by the initialization-processing unit, is continued in a time being longer than or equal to a second predetermined time, a car-speed-judgment unit that judges that an abnormality occurs when at least one of the comparison-judgment-processing unit and the initialization-judgment-processing unit judges that the abnormality occurs, and a motor-current-abnormality-judging unit that judges that an abnormality occurs when a state, in which a current threshold is defined based on at least the detected steering torque, the first car-speed-signal, and a judgment result of the car-speed-judgment unit, and the detected motor-current value is greater than the current threshold, is continued in a time being longer than or equal to a third predetermined time; and the limitation unit is configured in such a way that the limitation unit adds a predetermined limitation to the output of the motor-current-control unit, when the motor-current-abnormality-judging unit judges that the abnormality occurs, so that a LAN communication circuit must not be provided in a sub-control device, and a sub control device can be monitored by a cheap configuration. Moreover, for example, when an automatic parking control, which functions at a very low speed, is performed, the motor-current threshold is expanded, the automatic parking control is enabled, the motor-current threshold is set at a value, by which the safety at the running can be ensured, when the automatic parking control is not performed, and the motor-current threshold is set at a value, by which the safety at the running can be ensured, when an abnormality occurs for the car-speed-input process in the main control unit, whereby the automatic parking control and the power steering control can be performed while the safety is ensured. Moreover, in the initialization process in the sub-control device, when a state, in which the second signal is not initialized, is continued, the sub-control device judges that an abnormality occurs, so that the abnormality can be detected when the initialization process is stopped.

BRIEF DESCRIPTION OF THE DRAWINGS

FIG. 5B is a flowchart illustrating another process of the main control device in the control system and the electric power steering control device according to Embodiment 1 of the present invention;

FIG. 6A is a flowchart illustrating a process of a first signal-processing unit of the main control device in the control system and the electric power steering control device according to Embodiment 1 of the present invention;

DETAILED DESCRIPTION OF THE PREFERRED EMBODIMENTS

Embodiment 1

Figure 1:
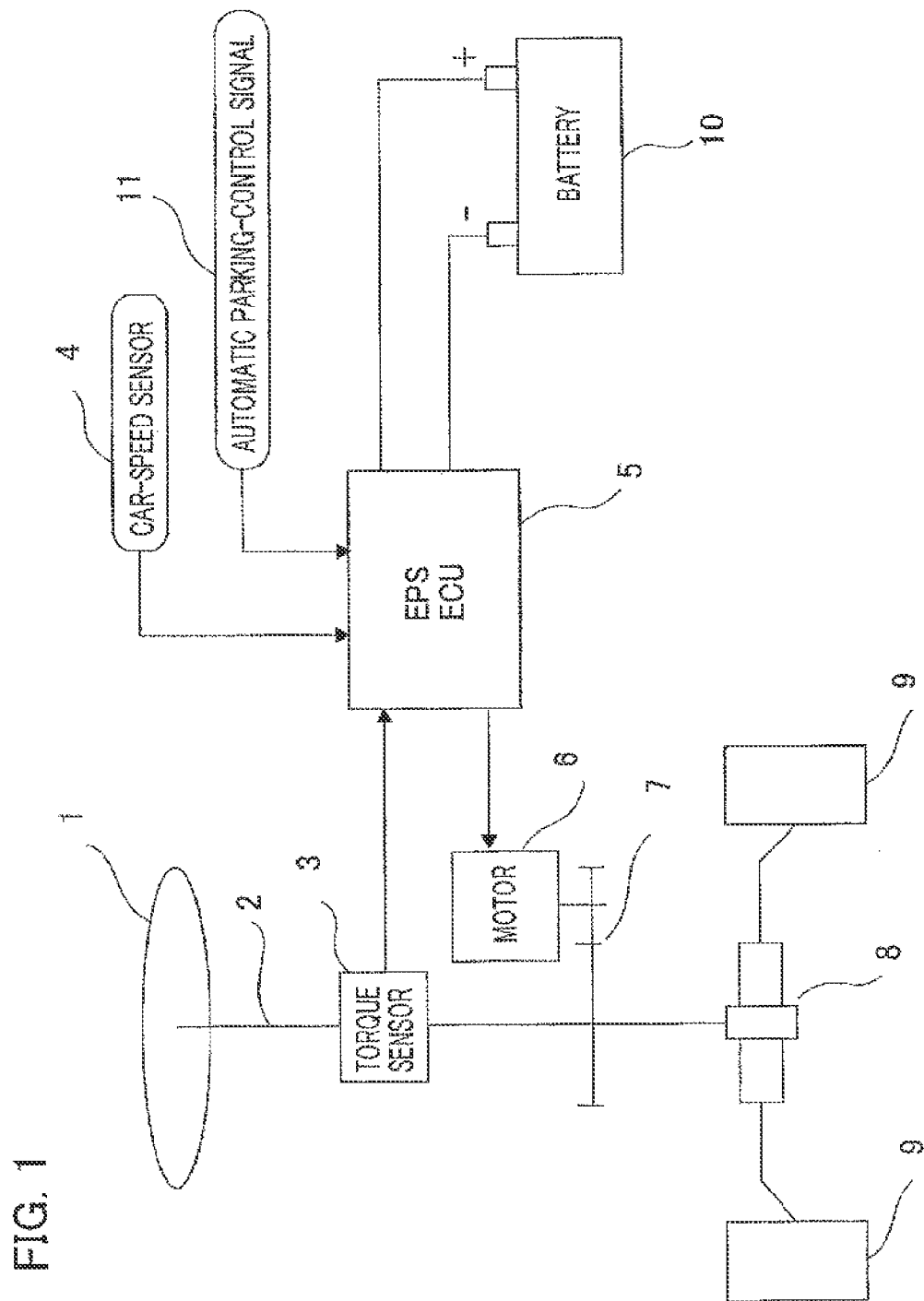
FIG. 1 is a block diagram illustrating a basic configuration of an electric power steering control device according to Embodiment 1 of the present invention.

FIG. 1 is a block diagram illustrating a basic configuration of an electric power steering control device according to Embodiment 1 of the present invention. In FIG. 1, a steering wheel 1 driven by a driver is fixed to a steering shaft 2, and a steering torque of the driver is transmitted to the steering shaft 2. A torque sensor 3 composing a torque detecting unit detects a steering torque applied to the steering shaft 2 so as to input a torque signal corresponding to the detected value of the steering torque into a control unit (hereinafter, refer to EPS-ECU) 5 for controlling an electric power steering and an engine.

A car-speed sensor 4 detects a car speed and inputs a signal corresponding to the detected value of the car speed torque into the EPS-ECU 5. An automatic parking-control signal 11 transmitted from an automatic parking-control device (not illustrated) for performing an automatic parking control is inputted into the EPS-ECU 5. A motor 6 is driven in accordance with a signal transmitted from the EPS-ECU 5. An output of the motor 6 is applied to the steering shaft 2 via a gear 7 so as to assist a steering torque of the driver. A torque, in which the steering torque transmitted from the driver and a steering-subservience torque transmitted from the motor 6 are synthesized, is transmitted from the steering shaft 2 to front wheels 9 of a car via a rack-and-pinion mechanism 8. A battery 10 supplies an electric power to the EPS-ECU 5.

Figure 2:
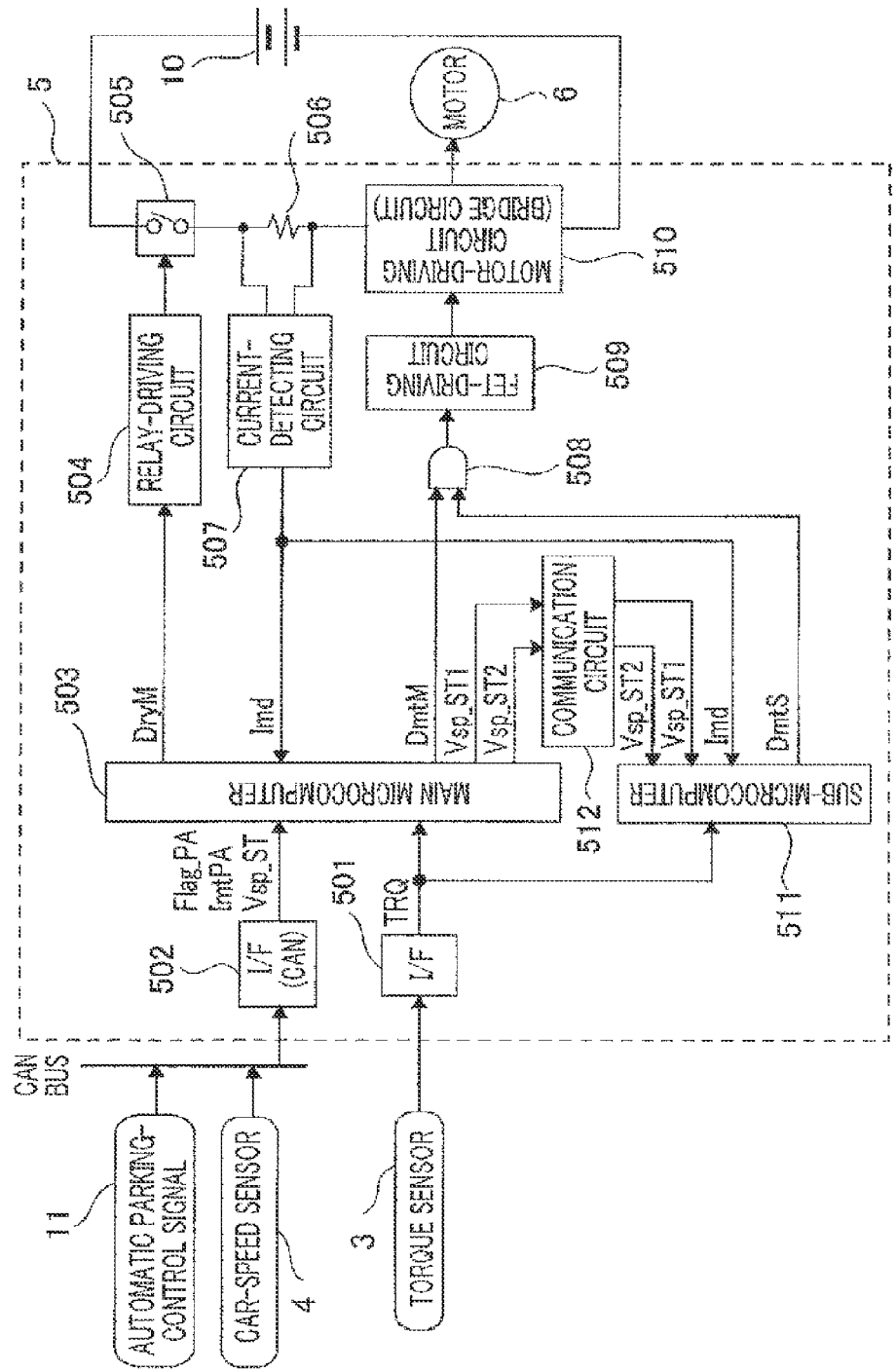
FIG. 2 is a control block diagram of a control system and the electric power steering control device according to Embodiment 1 of the present invention.

Hereinafter, an internal configuration of the EPS-ECU 5 will be explained. FIG. 2 is a control block diagram of a control system and the electric power steering control device according to Embodiment 1 of the present invention. In FIG. 2, reference symbols, which are the same as those in FIG. 1, refer to the same parts. In FIG. 2, the EPS-ECU 5 includes a first interface circuit 501 for inputting a signal transmitted from the torque sensor 3, and a second interface circuit 502 for inputting, via CANBUS (control area network bus), a car-speed signal transmitted from the car-speed sensor 4 and the automatic parking-control signal 11 transmitted from the automatic parking-control device. The second interface circuit 502 outputs an automatic parking-control signal ImtPA and an automatic parking flag Flag_PA, which are generated based on the automatic parking-control signal 11 as described below.

Moreover, the EPS-ECU 5 includes a main microcomputer 503 operated as a main control unit, in which a program is loaded so as to control an electric power steering, a relay-driving circuit 504 for driving a relay, a relay 505 for interrupting a motor current of the motor 6 at an abnormal time that is described later, a shunt resistor 506 for detecting the motor current passing through the motor 6, a current-detecting circuit 507 that amplifies a potential difference generated between both ends of the shunt resistor 506 so as to input the potential difference to the main microcomputer 503, and an AND circuit 508 that drives the motor 6 when the main microcomputer 503 and a sub-microcomputer 511 output electric power for turning on the motor 6. A motor-current-detecting unit is composed of the shunt resistor 506 and the current-detecting circuit 507. Moreover, a sub-control device is composed of the sub-microcomputer 511.

Furthermore, the EPS-ECU 5 includes a motor-driving circuit 510, in which a bridge circuit is configured by transistors so as to control a current of the motor 6, a FET-driving circuit 509 for driving the motor-driving circuit 510, and a communication circuit 512 used as a communication-processing unit for communicating between the main microcomputer 503 and the sub-microcomputer 511.

The sub-microcomputer 511 is configured in such a way that it detects an abnormality of the main microcomputer 503 by using a torque signal TRQ transmitted from the first interface circuit 501 (hereinafter, simply referred to as a steering torque), a motor current signal Imd transmitted from the current-detecting circuit 507 (hereinafter, simply referred to as a motor current), a first car-speed signal Vsp_ST1 used as the following first signal, and a second car-speed signal Vsp_ST2 used as the following second signal, and then, when the abnormality of the main microcomputer 503 is detected, a current of the motor 6 is limited, as described later, via the AND circuit 508.

Figure 3:
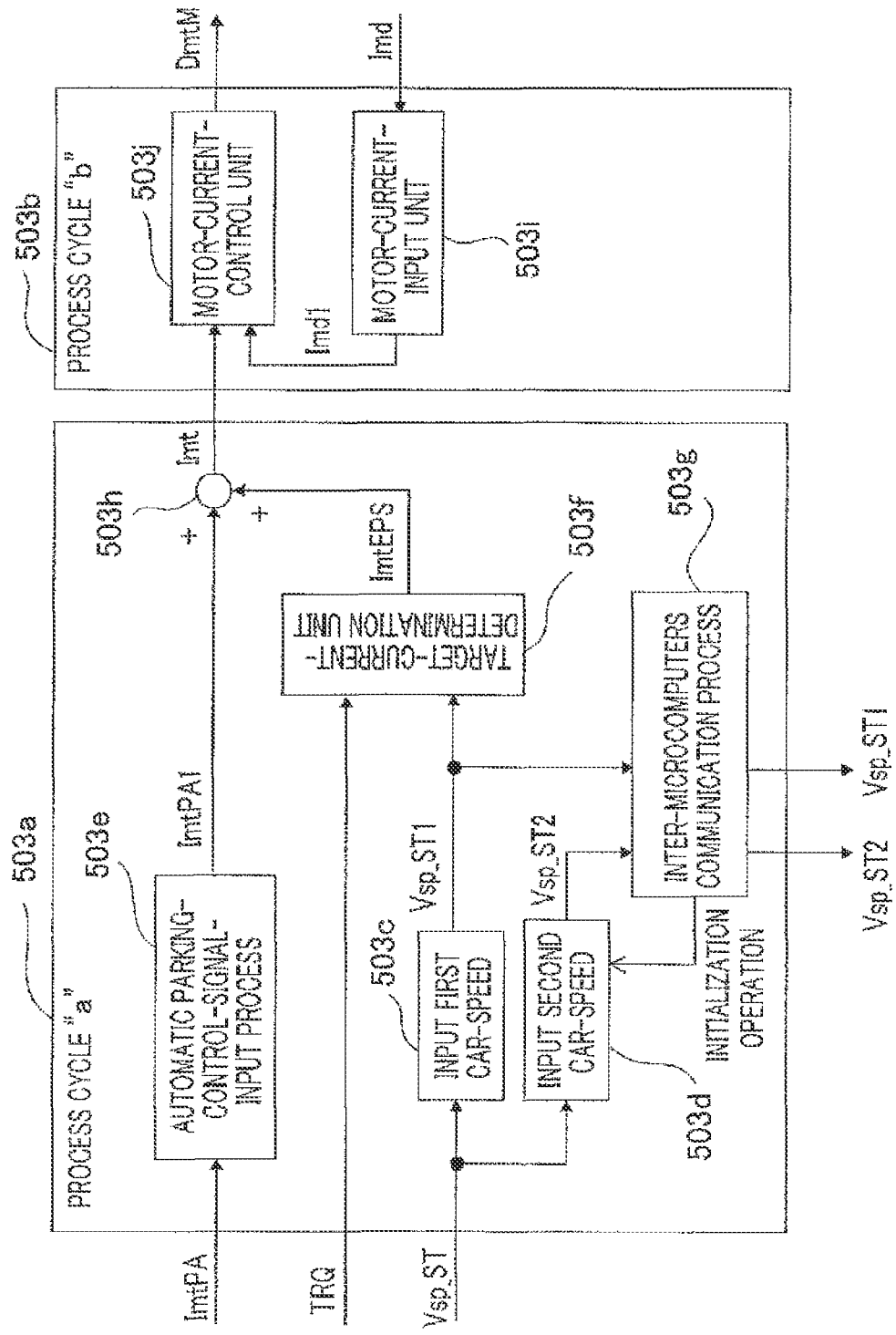
FIG. 3 is a control block diagram of a main control device in the control system and the electric power steering control device according to Embodiment 1 of the present invention.

Hereinafter, an operation of the main microcomputer 503 will be explained. FIG. 3 is a control block diagram of a main control device in the control system and the electric power steering control device according to Embodiment 1 of the present invention. In FIG. 3, the main microcomputer 503 includes a first processing unit 503a for performing a process in a process cycle "a" (for example, 1 millisecond), and a second processing unit 503b for performing a process in a process cycle "b" (for example, 0.1 millisecond).

Firstly, a configuration of the first processing unit 503a will be explained. The first processing unit 503a includes a first car-speed-input-processing unit 503c used as a first signal processing unit, a second car-speed-input-processing unit 503d used as a second signal processing unit, an automatic parking-control-signal-input-processing unit 503e, a target-current-determination unit 503f, an inter-microcomputers communication-processing unit 503g used as a communication processing unit, and an addition unit 503h.

The first car-speed-input-processing unit 503c obtains a car-speed signal Vsp_ST that is inputted from the car-speed sensor 4 via the CANBUS in a predetermined cycle "c" (for example, 100 millisecond), and generates the first car-speed signal Vsp_ST1. The second car-speed-input-processing unit 503d obtains the car-speed signal Vsp_ST that is inputted from the car-speed sensor 4 via the CANBUS in the predetermined cycle "c" (for example, 100 millisecond), and generates the second car-speed signal Vsp_ST2. The automatic parking-control-signal-input-processing unit 503e generates an automatic parking-control-target current ImtPA1 in accordance with the automatic parking-control signal 11 inputted via the CANBUS.

The target-current-determination unit 503f decides a power-steering-control-target current ImtEPS in accordance with the torque signal TRQ and the first car-speed signal Vsp_ST1. The inter-microcomputers communication-processing unit 503g transmits the first car-speed signal Vsp_ST1 and the second car-speed signal Vsp_ST2 to the sub-microcomputer 511. The addition unit 503h adds the automatic parking-control-target current ImtPA1 to the power-steering-control-target current ImtEPS so as to generate a final target current Imt.

Next, a configuration of the second processing unit 503b will be explained. The second processing unit 503b includes a motor-current-input-processing unit 503i and a motor-current-control unit 503j.

Figure 4:
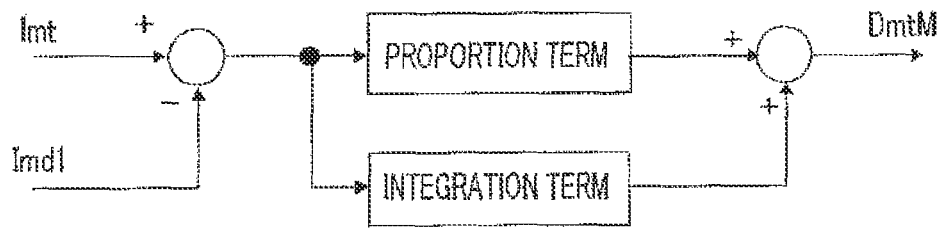
FIG. 4 is a control block diagram of a PI control in the control system and the electric power steering control device according to Embodiment 1 of the present invention.

The motor-current-input-processing unit 503i performs an A/D conversion process for a motor current Imd inputted from the current-detecting circuit 507, and generates a motor-current-detecting signal Imd1 in which a current for rotating the motor in a right direction is set as a plus current, and a current for rotating the motor in a left direction is set as a minus current. The motor-current-control unit 503j compares the final target current Imt with the motor-current-detecting signal Imd1, and performs feedback control in such a way that both value is equal to each other. FIG. 4 is a control block diagram of a PI control in the control system and the electric power steering control device according to Embodiment 1 of the present invention. The motor-current-input-processing unit 503i is configured by, for example, a general PI control unit indicated in FIG. 4. In other words, in FIG. 4, the motor-current-input-processing unit 503i compares the motor-current-detecting signal Imd1 outputted from the motor-current-input-processing unit 503i with the final target current Imt outputted from the addition unit 503h, and performs feedback control, by using the proportion term and the integration term, in such a way that both values are identical, whereby motor output DmtM is generated.

Figure 5A:
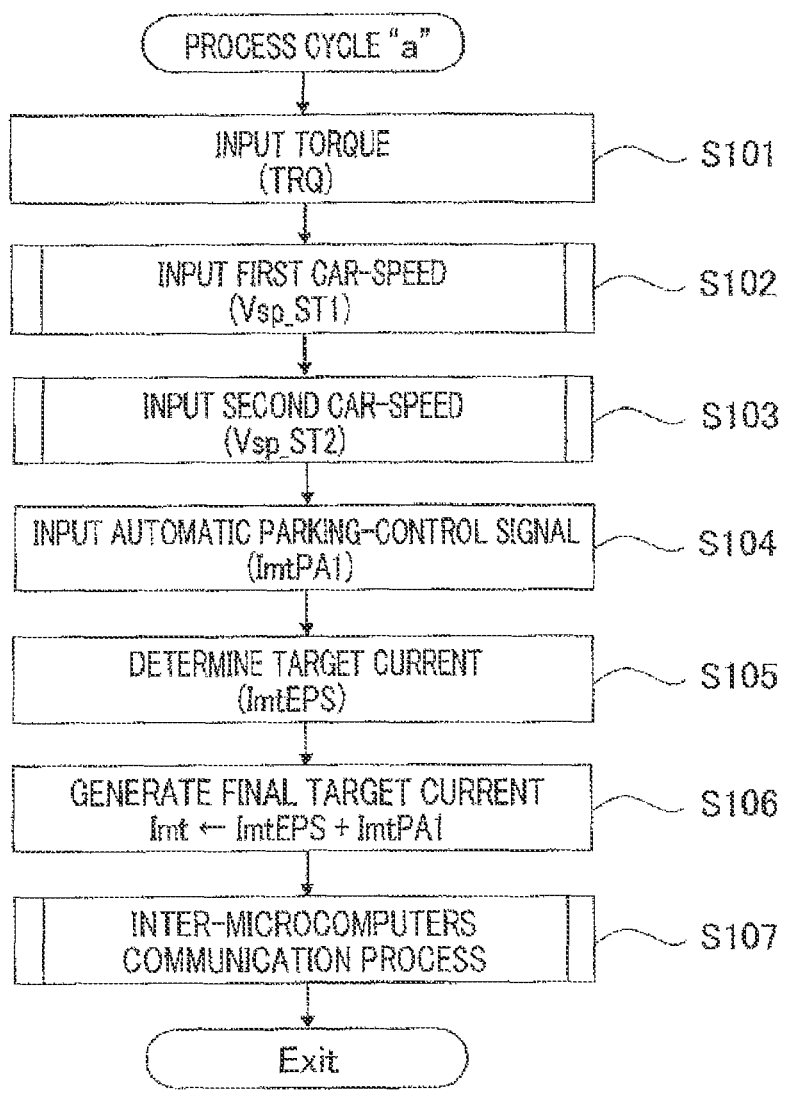
FIG. 5A is a flowchart illustrating a process of the main control device in the control system and the electric power steering control device according to Embodiment 1 of the present invention.

Hereinafter, a content processed by the first processing unit 503a in the main microcomputer 503 will be explained. FIG. 5A is a flowchart illustrating a process of the main control device in the control system and the electric power steering control device according to Embodiment 1 of the present invention.

Firstly, at step S101 in FIG. 2 to FIG. 3 and FIG. 5A, a signal transmitted from the torque sensor 3 is inputted so as to generate the torque signal TRQ. Secondly, at step S102, a process is performed, by the first car-speed-input-processing unit 503c, in accordance with the car-speed signal Vsp_ST transmitted from the car-speed sensor 4, and the first car-speed signal Vsp_ST1 is generated. Thirdly, at step S103, a process is performed, by the second car-speed-input-processing unit 503d, and the second car-speed signal Vsp_ST2 is generated.

Next, at step S104, the automatic parking-control signal ImtPA transmitted from the second interface circuit 502 is inputted so as to process by the automatic parking-control-signal-input-processing unit 503e, and the automatic parking-control-target current ImtPA1 is generated. At step S105, the power-steering-control-target current ImtEPS is determined by the target-current-determination unit 503f, based on the following characteristics indicated in FIG. 7, in accordance with the torque signal TRQ transmitted from the first interface circuit 501 and the first car-speed signal Vsp_ST1.

Figure 7:
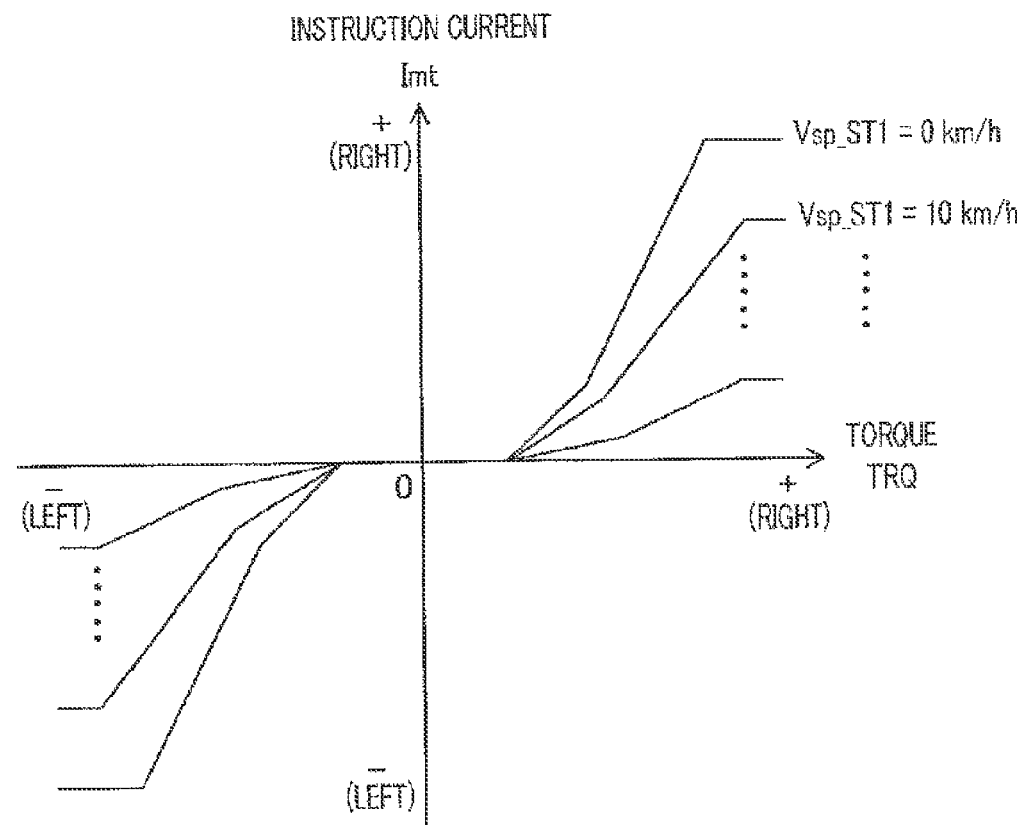
FIG. 7 is a characteristic chart illustrating a control-characteristic locus in a normal state of the control system and the electric power steering control device according to Embodiment 1 of the present invention.

FIG. 7 is a characteristic chart illustrating a control-characteristic locus in a normal state of the control system and the electric power steering control device according to Embodiment 1 of the present invention. In FIG. 7, the final target current Imt of the above-described motor 6 is indicated along a vertical axis, and the torque TRQ is indicated along a horizontal axis. As illustrated in FIG. 7, characteristics of the final target current (instruction current) Imt with respect to the torque TRQ is varied in accordance with values of the first car-speed signal Vsp_ST1. The above-described target-current-determination unit 503f determines the power-steering-control-target current ImtEPS in accordance with the characteristics indicated in FIG. 7.

Next, at step S106, the automatic parking-control-target current ImtPA1 is added to the power-steering-control-target current ImtEPS by the addition unit 503h, and the final target current Imt is generated. Lastly, at step S107, the first car-speed signal Vsp_ST1 and the second car-speed signal Vsp_ST2 are transmitted to the sub-microcomputer 511. The process illustrated in FIG. 5A is performed in a predetermined cycle (for example, 1 millisecond).

Hereinafter, a content processed by the second processing unit 503b in the main microcomputer 503 will be explained. FIG. 5B is a flowchart illustrating another process of the main control device in the control system and the electric power steering control device according to Embodiment 1 of the present invention.

Firstly, at step S201 in FIG. 2 through FIG. 3 and FIG. 5B, the motor-current-detecting signal Imd1, which is generated by the motor-current-input-processing unit 503i base on the current signal Imd transmitted from the current-detecting circuit 507, is inputted to the motor-current-control unit 503j. Secondly, at step S202, a current control according to the above-described PI control indicated in FIG. 4 is performed in accordance with the above-described final target current Imt generated at step S106 in FIG. 5A and the above-described motor-current-detecting signal Imd1 obtained at step S201, and the motor output DmtM is outputted so as to drive the motor 6. The above-described processes are performed in a predetermined cycle (for example, 0.1 millisecond).

Hereinafter, a detailed explanation for the above-described process performed by the first car-speed-input-processing unit 503c indicated in FIG. 3, in other words, for the process performed at step S102 in FIG. 5A. FIG. 6A is a flowchart illustrating a process of a first signal-processing unit of the main control device in the control system and the electric power steering control device according to Embodiment 1 of the present invention.

Firstly, at step S301 in FIG. 2 through FIG. 3 and FIG. 6A, it is judged whether a car-speed signal transmitted from the car-speed sensor 4 is received or not received. This judgment is performed on the basis of whether a car-speed-reception flag transmitted from the second interface circuit 502 is "1" or not. When it is judged, based on the result of the decision at step S301, that the car-speed-reception flag is "1" and the car-speed signal is received (Yes), the process proceeds to step S302. Secondly, the car-speed signal Vsp_ST used as car-speed data is inputted so as to be substituted into "X". In other words, the inputted car-speed signal Vsp_ST is substituted into "X". Thirdly, at step S303, when the car-speed signal Vsp_ST, which is inputted at step S302, is equal to an initial value FFh (Yes), the process proceeds to step S304, and the initial value FFh is substituted into "X". When it is judged, based on the result of the decision at step 303, that the inputted car-speed signal Vsp_ST is not equal to an initial value FFh (No), the process sequentially proceeds to step S305. At step S305, the value, which is substituted into "X" ("X"=FFh, or "X"=Vsp_ST), is substituted into the first car-speed signal Vsp_ST1.

When it is judged, based on the result of the decision at step S301, that the car-speed-reception flag is not "1" and the car-speed signal is not received (No), the above-described processes are not performed at steps S302 through S305, and the last value of the first car-speed signal Vsp_ST1 is kept.

Next, the processes of the flowchart indicated in FIG. 6A are repeated, whereby the first car-speed signal Vsp_ST1 is updated.

Figure 6B:
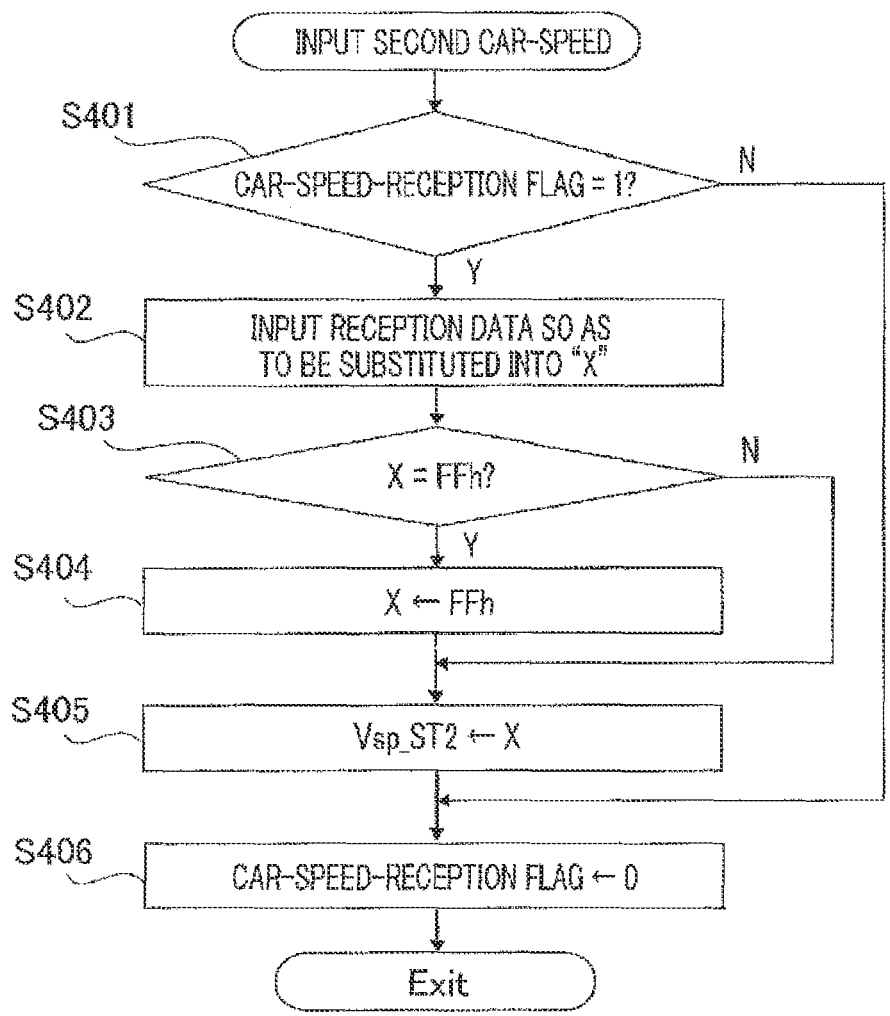
FIG. 6B is a flowchart illustrating a process of a second signal-processing unit of the main control device in the control system and the electric power steering control device according to Embodiment 1 of the present invention.

Hereinafter, processes of the second car-speed-input-processing unit 503d illustrated in FIG. 3, in other words, processes at step S103 illustrated in FIG. 5A will be explained in detail. FIG. 6B is a flowchart illustrating a process of a second signal-processing unit of the main control device in the control system and the electric power steering control device according to Embodiment 1 of the present invention.

Firstly, at step S401 in FIG. 2 to FIG. 3 and FIG. 6B, it is judged whether the car-speed signal transmitted from the car-speed sensor 4 is received or not received. This judgment is performed on the basis of whether the car-speed-reception flag transmitted from the second interface circuit 502 is "1" or not. When the second signal-processing unit judges, based on the result of the decision at step S401, that the car-speed-reception flag is "1" and the car-speed signal is received (Yes), the process proceeds to step S402. Secondly, the car-speed signal Vsp_ST used as car-speed data is inputted so as to be substituted into "X". In other words, the inputted car-speed signal Vsp_ST is substituted into "X".

Thirdly, at step S403, when the car-speed signal Vsp_ST, which is inputted at step S402, is equal to an initial value FFh (Yes), the process proceeds to step S404, and the initial value FFh is substituted into "X". When it is judged, based on the result of the decision at step 403, that the inputted car-speed signal Vsp_ST is not equal to an initial value FFh (No), the process sequentially proceeds to step S405. At step 405, the value, which is substituted into "X" ("X"=FFh, or "X"=Vsp_ST), is substituted into the second car-speed signal Vsp_ST2.

When it is judged, based on the result of the decision at step S401, that the car-speed-reception flag is not "1" and the car-speed signal is not received (No), the above-described processes are not performed at steps S402 through S405, and the last value of the first car-speed signal Vsp_ST2 is kept. Lastly, in order to obtain a next car-speed signal at step S406, the car-speed reception flag is initialized, and "0" is set to the car-speed reception flag.

Next, the processes of the flowchart indicated in FIG. 6B are repeated, whereby the second car-speed signal Vsp_ST2 is updated.

Figure 8:
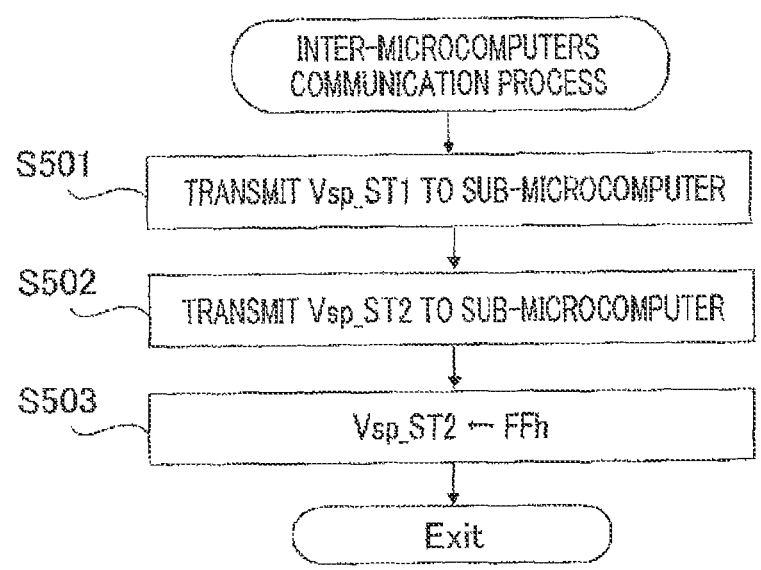
FIG. 8 is a flowchart illustrating a process of a communication-processing unit in the control system and the electric power steering control device according to Embodiment 1 of the present invention.

Hereinafter, processes of the inter-microcomputers communication-processing unit 503g illustrated in FIG. 3, in other words, processes at step S107 illustrated in FIG. 5A will be explained in detail. FIG. 8 is a flowchart illustrating a process of a communication-processing unit in the control system and the electric power steering control device according to Embodiment 1 of the present invention.

Firstly, at step S501 in FIG. 8, the first car-speed signal Vsp_ST1 obtained by the first car-speed-input-processing unit 503c is transmitted to the sub-microcomputer 511, and then, at step S502, the second car-speed signal Vsp_ST2 obtained by the second car-speed-input-processing unit 503d is transmitted to the sub-microcomputer 511. Secondly, at step S503, the second car-speed signal Vsp_ST2 is initialized, and the initial value FFh is substituted into the second car-speed signal Vsp_ST2. Next, the processes of the flowchart indicated in FIG. 8 are repeated. In addition, a process at step S503 composes processes of an initialization-processing unit.

Figure 9:
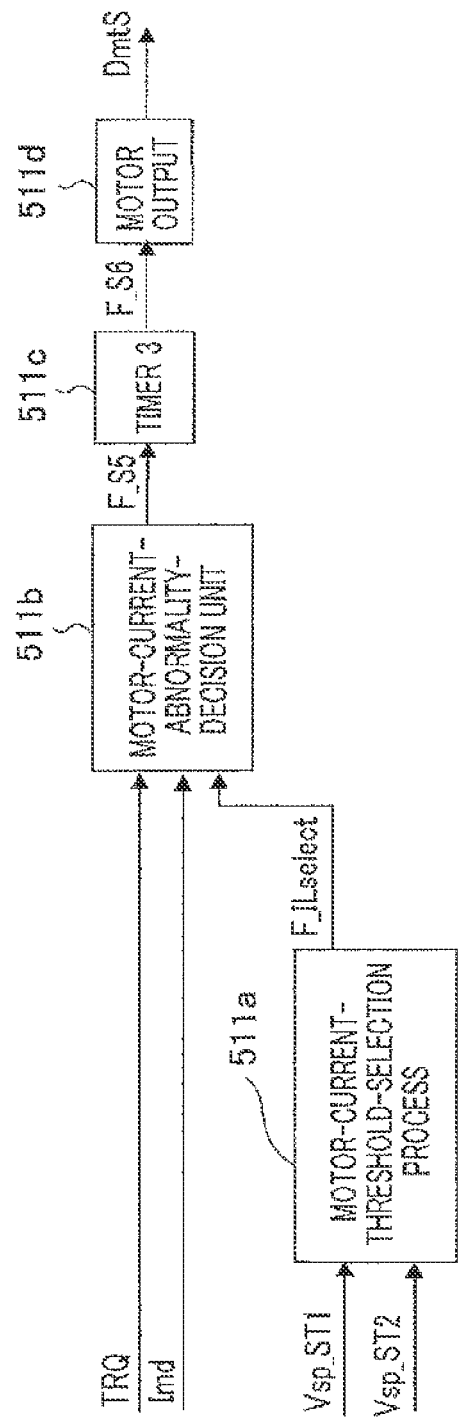
FIG. 9 is a control-block diagram of a sub-control unit in the control system and the electric power steering control device according to Embodiment 1 of the present invention.

Hereinafter, processes of the sub-microcomputer 511, illustrated in FIG. 2, used as the above-described sub-control device will be explained. FIG. 9 is a control-block diagram of a sub-control unit in the control system and the electric power steering control device according to Embodiment 1 of the present invention.

In FIG. 9, a motor-current-threshold-selection-processing unit 511a generates a threshold-selection signal F_ILselect in accordance with the first car-speed signal Vsp_ST1 and the second car-speed signal Vsp_ST2. A motor-current-abnormality-judging unit 511b judges, based on the threshold-selection signal F_ILselect generated by the motor-current-threshold-selection-processing unit 511a, the motor current Imd inputted from the current-detecting circuit 507, and the torque signal TRQ inputted from the torque sensor 3 via the first interface circuit 501, whether the motor current Imd is abnormal or not abnormal. When the motor current Imd is normal, "0" is substituted into a motor-current-judgment output F_S5, whereas when the motor current Imd is abnormal, "1" is substituted into the motor-current-judgment output F_S5.

When the value of the motor-current-judgment output F_S5 outputted from the motor-current-abnormality-judging unit 511b is "1" and continued in a third predetermined time (for example, 50 millisecond), a third timer-processing unit substitutes "1" into a third timer output F_S6, otherwise the third timer-processing unit substitutes "0" into the third timer output F_S6. When the value of the third timer output F_S6 is "0", a motor-output unit 511d substitutes "1" into a motor output DmtS, whereas when the value of the third timer output F_S6 is "1", the motor-output unit 511d substitutes value "0" into the motor output DmtS. Moreover, once "0" is substituted into the motor output DmtS, "0" of the motor output DmtS is maintained until the electric power of the EPS-ECU is turned off.

Figure 10:
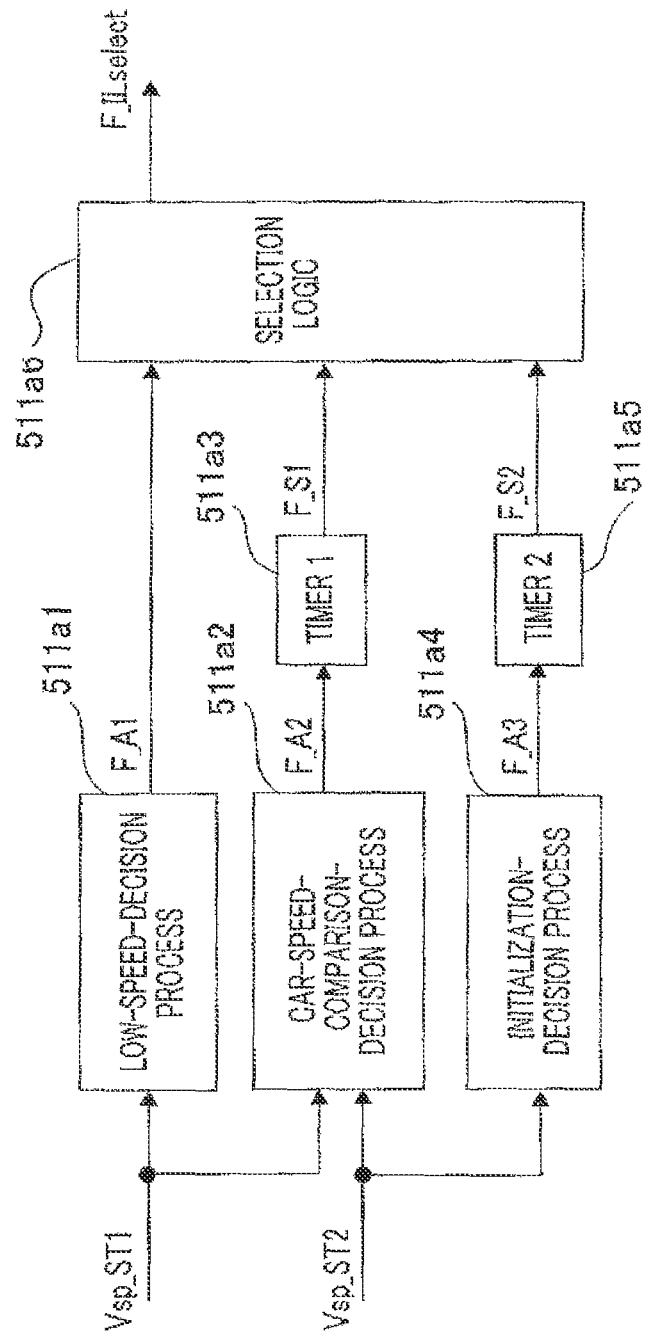
FIG. 10 is a block diagram illustrating a motor-current-threshold-selection process of the sub-control unit in the control system and the electric power steering control device according to Embodiment 1 of the present invention.

Hereinafter, processes of the motor-current-threshold-selection-processing unit 511a will be explained. FIG. 10 is a block diagram illustrating a motor-current-threshold-selection process of the sub-microcomputer in the control device and the electric power steering control device according to Embodiment 1 of the present invention.

In FIG. 10, a low-speed-judgment-processing unit 511a1 judges whether a value of the first car-speed signal Vsp_ST1 is lower than a car speed (for example, 10 km/h), at which an automatic parking control is performed, or not lower than the car speed. When the value of the first car-speed signal Vsp_ST1 is lower than the car speed at which the automatic parking control is performed, "1" is substituted into a low-speed-judgment output F_A1, whereas when the value of the first car-speed signal Vsp_ST1 is not lower than the car speed at which the automatic parking control is performed, "0" is substituted into a low-speed-judgment output F_A1. A car-speed-comparison-judgment-processing unit 511a2 compares the first car-speed signal Vsp_ST1 with the second car-speed signal Vsp_ST2. When the first car-speed signal Vsp_ST1 is not equal to the second car-speed signal Vsp_ST2 (abnormal state), "1" is substituted into a car-speed-comparison-judgment output F_A2, whereas when the first car-speed signal Vsp_ST1 is equal to the second car-speed signal Vsp_ST2 (normal state), "0" is substituted into a car-speed-comparison-judgment output F_A2.

When the value of the car-speed-comparison-judgment output F_A2 outputted from the car-speed-comparison-judgment-processing unit 511a2 is "1" and continued in a first predetermined time (for example, 500 millisecond), a first timer-processing unit 511a3 substitutes "1" into a first timer output F_S1, otherwise the first timer-processing unit 511a3 substitutes "0" into the first timer output F_S1. When the value of the second car-speed signal Vsp_ST2 is equal to the initial value FFh, an initialization-judgment-processing unit 511a4 substitutes "0" into an initialization-judgment output F_A3, whereas when the value of the second car-speed signal Vsp_ST2 is not equal to the initial value FFh, "1" is substituted into the initialization-judgment output F_A3.

When the value of the initialization-judgment output F_A3 is "1" and continued in a second predetermined time (for example, 500 millisecond), a second timer-processing unit 511a5 substitutes "1" into a second timer output F_S2, otherwise the second timer-processing unit 511a5 substitutes "0" into the second timer output F_S2. A selection-logic-processing unit 511a6 outputs a value of a selection-logic output F_ILselect, based on a truth table in the following Table 1, in accordance with the low-speed-judgment output F_A1, the first car-speed signal Vsp_ST1, and the second car-speed signal Vsp_ST2.

TABLE 1

| F_A1 | F_S1 | F_S2 | F_ILselect |
|------|------|------|------------|
| 0    | 0    | 0    | 0          |
| 1    |      |      | 1          |
| —    | 1    | —    | 0          |
| —    | —    | 1    | 0          |

In the Table 1, it is indicated that "—" is not involved in the generation of the selection-logic output.

Figure 11A:
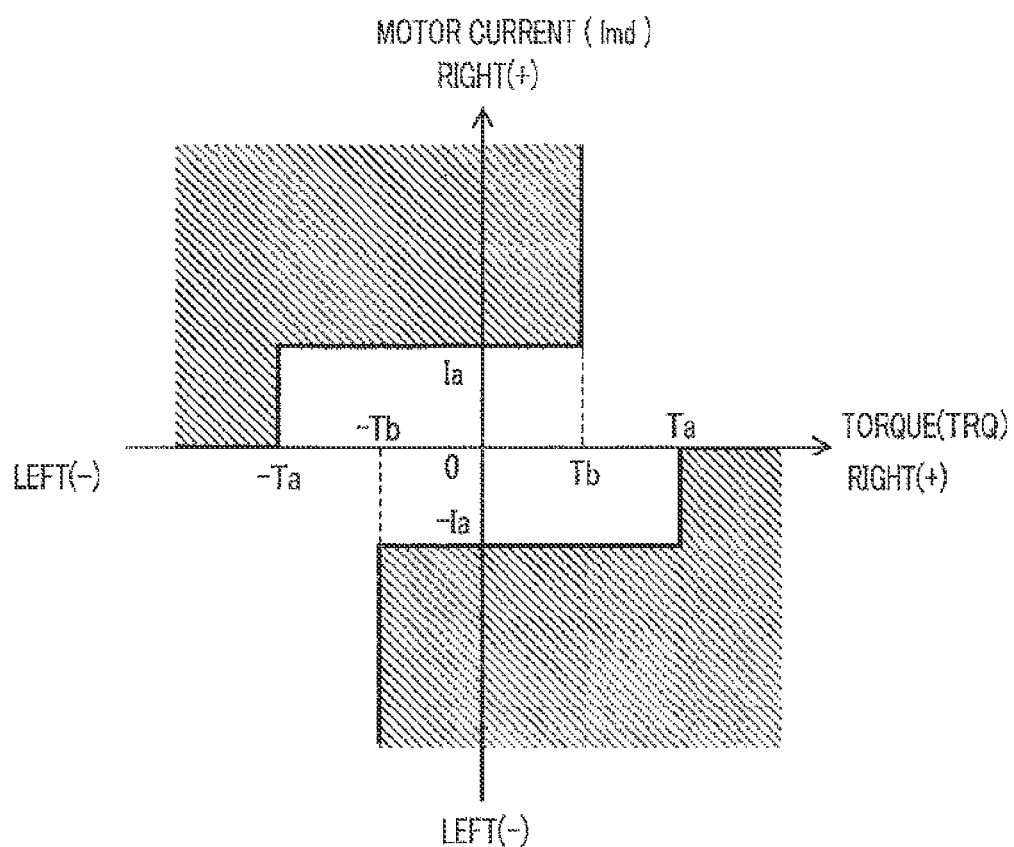
FIG. 11A is an explanation chart illustrating a first motor-current threshold in the control system and the electric power steering control device according to Embodiment 1 of the present invention.

Hereinafter, processes of the motor-current-abnormality-judging unit 511b will be explained. FIG. 11A is an explanation chart illustrating a first motor-current threshold in the control system and the electric power steering control device according to Embodiment 1 of the present invention. In FIG. 11A, the torque TRQ is indicated along a horizontal axis, and a torque for driving the steering in a right direction is indicated in a plus area ("+" area), whereas a torque for driving the steering in a left direction is indicated in a minus area ("−" area). Similarly, the motor current Imd is indicated along a vertical axis, and a motor current for driving the steering shaft in a right direction is indicated in a plus area ("+" area), whereas a torque current for driving the steering shaft in a left direction is indicated in a minus area ("−" area). Hatched areas in FIG. 11A indicate areas in which a driving operation of the motor is inhibited, and the other areas in FIG. 11A indicate areas in which a driving operation of the motor is not inhibited.

For example, when the detected torque TRQ is positioned near the middle of the torque, in other words, in a range of the threshold ±Tb [Nm], a motor current Imd, which is lower than or equal to ±Ia [A], can be passed through. Moreover, when the detected torque TRQ is greater than +Tb [Nm], a motor current Imd, which is positioned at a "+" range, can be passed without limitation. Furthermore, when the detected torque TRQ is positioned between +Tb [Nm] and +Ta [Nm], and a motor current is positioned at a "−" range, a motor current Imd, which is lower than or equal to −Ia [A], can be passed through.

Furthermore, when the detected torque TRQ is greater than +Ta [Nm], it is defined that a motor current Imd, which is positioned at a "−" range, can't be passed through. A characteristic of a torque TRQ, which is positioned at a "−" range (minus torque), is reverse to a characteristic of a torque TRQ, which is positioned at a "+" range. In other words, when the detected torque TRQ is lower than −Ta [Nm] (positioned at a "−" range), it is defined that a motor current Imd, which is positioned at a "+" range, can't be passed through.

Because the first motor-current threshold is defined as illustrated in FIG. 11A, a motor current Imd, which is passed through in a same direction of the torque TRQ, can be passed through without limitation in a case where the detected torque TRQ is greater than or equal to the threshold ±Ta (absolute value of the torque TRQ is greater than or equal to absolute value of the threshold Ta), and a motor current Imd, which is passed through in an opposite direction of the torque TRQ, can't be passed through. Moreover, when the detected torque TRQ is positioned in a range of the threshold ±Ta, which is positioned near the middle of the torque, and positioned in a range of the predetermined value ±Ia [A], the motor current Imd can be passed through.

Figure 11B:
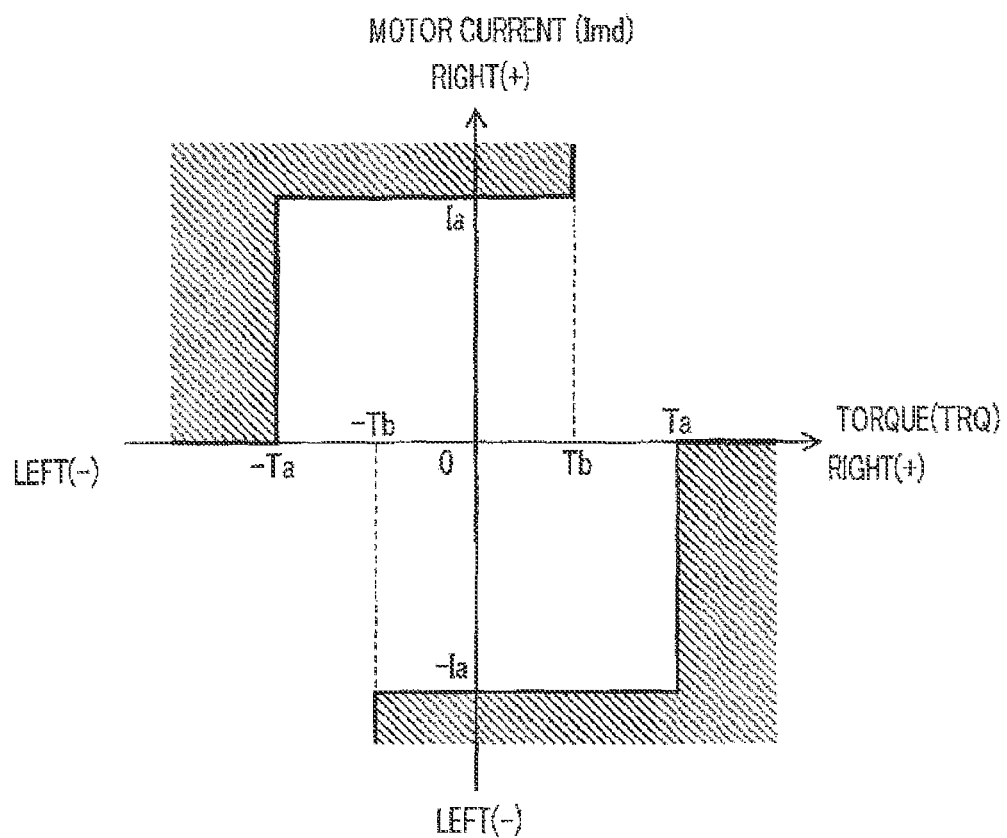
FIG. 11B is an explanation chart illustrating a second motor-current threshold in the control system and the electric power steering control device according to Embodiment 1 of the present invention.

Although the motor-current-abnormality-judging unit 511b has two kinds of s for this motor-drive-inhibition area, one of the characteristics corresponds to a characteristic of the first motor-current threshold illustrated in FIG. 11A, and the other characteristic corresponds to a characteristic of the second motor-current threshold illustrated in FIG. 11B. In other words, FIG. 11B is an explanation chart illustrating a second motor-current threshold in the control system and the electric power steering control device according to Embodiment 1 of the present invention.

Values in FIG. 11A and FIG. 11B are defined in accordance with, for example, the following Table 2. When the selection-logic output F_ILselect is "1", a characteristic indicated in FIG. 11B is selected, and when the selection-logic output F_ILselect is "0", a characteristic indicated in FIG. 11A is selected.

TABLE 2

|    | FIG. 11A | FIG. 11B |
|----|----------|----------|
| Ia | 5 [A]    | 50 [A]   |
| Ta | 3 [Nm]   | 3 [Nm]   |
| Tb | 1 [Nm]   | 1 [Nm]   |

Because the control system according to Embodiment 1 of the present invention is configured as described above, it is operated as described below. Firstly, a case, in which the control system is operated as the electric power steering control device, will be explained. In FIGS. 1 through 3, when a driver steers the steering wheel 1, the torque signal TRQ is obtained by the torque sensor 3 and the first interface circuit 501. Secondly, the car-speed signal Vsp_ST is obtained, from the car-speed sensor 4 through the CANBUS, by the second interface circuit 502 in a predetermined cycle "c", and then, the first car-speed signal Vsp_ST1 and the second car-speed signal Vsp_ST2 are obtained by the second car-speed-input-processing unit 503d.

Thirdly, the power-steering-control-target current ImtEPS is determined by the target-current-determination unit 503f. The power-steering-control-target current ImtEPS is added to the automatic parking-control-target current ImtPA1 by the addition unit 503h, whereby the final target current Imt is generated.

The motor-current-control unit 503j compares the final target current Imt with the motor-current-detecting signal Imd1, and performs feedback control by using the proportion term and the integration term in such a way that two values of these items are identical, whereby the motor 6 is energized. At this time, the motor current characteristic becomes the above-described characteristic indicated in FIG. 7, so that a motor torque corresponding to steering power of a driver is generated in the motor 6, and the motor torque is transmitted to the steering shaft 2 via the gear 7, whereby the steering power of the driver is reduced. The above-described contents are operations of the power steering control device.

Hereinafter, an automatic parking control will be explained. The automatic parking-control signal 11, used as ImtPA, is inputted to the main microcomputer 503 via the CANBUS and the second interface circuit 502. In the main microcomputer 503, the automatic parking-control-target current ImtPA1 is generated by the automatic parking-control-signal-input-processing unit 503e. The addition unit 503h adds the generated automatic parking-control-target current ImtPA1 to the power-steering-control-target current ImtEPS generated by the target-current-determination unit 503f, and generates the final target current Imt. The motor-current-control unit 503j passes the current, which is controlled based on the final target current Imt, to the motor 6. Thereby, the car is steered by an automatic parking-control device (not illustrated), and an automatic parking control of the car is performed.

Figure 12:
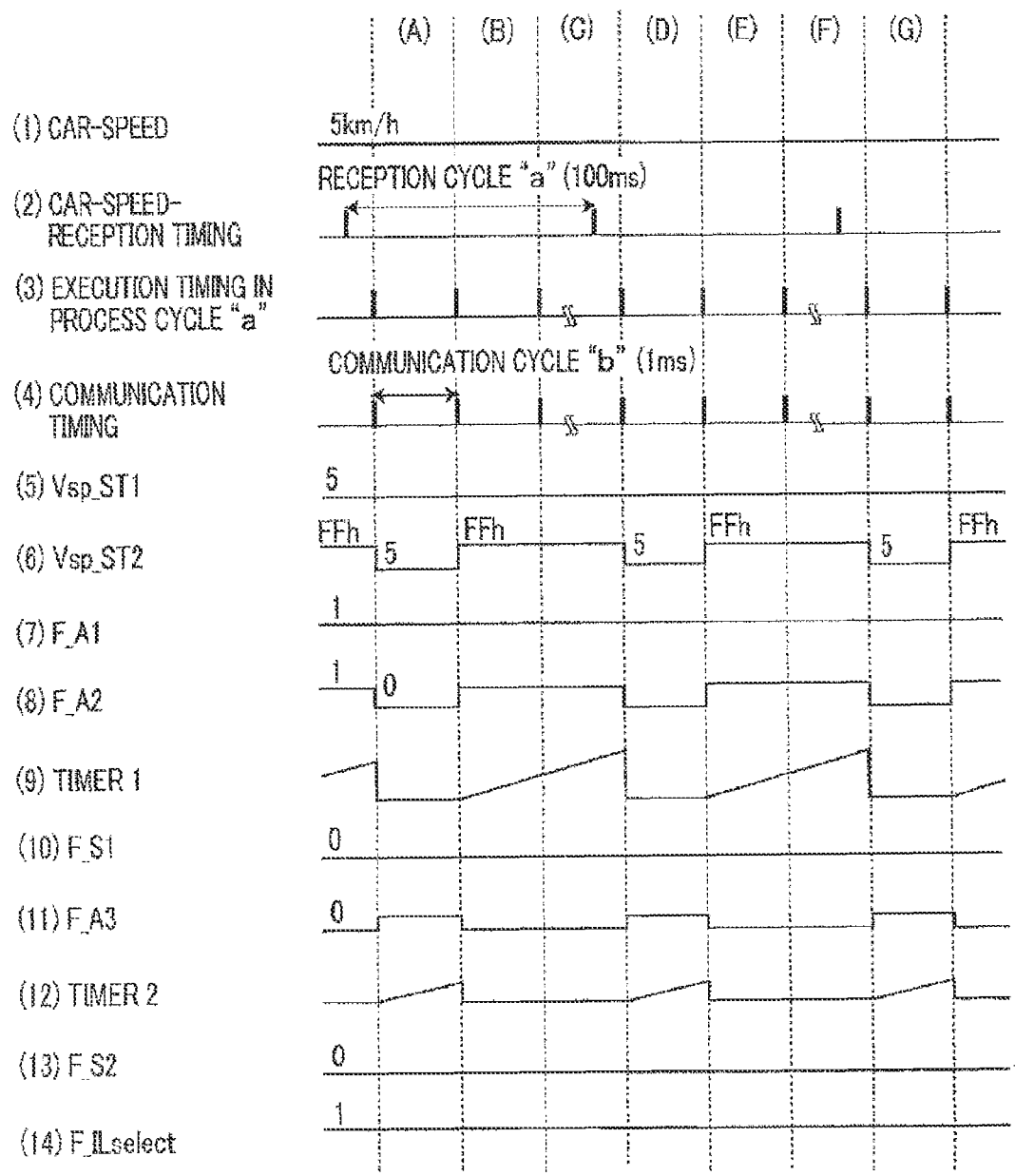
FIG. 12 is a timing chart illustrating an operation, in a state where the main control device is normally operated and a car speed is low, of the control system and the electric power steering control device according to Embodiment 1 of the present invention.

Hereinafter, operations of the main microcomputer 503 in a normal state will be explained. FIG. 12 is a timing chart illustrating an operation, in a state where the main control device is normally operated and a car speed is low, of the control system and the electric power steering control device according to Embodiment 1 of the present invention.

In FIG. 12, a waveform (1) indicates car-speed detected by the car-speed sensor 4, a waveform (2) indicates car-speed-reception timing received, in a predetermined cycle "c", from the car-speed sensor 4 via the CANBUS and the second interface circuit 502, a waveform (3) indicates execution timing of processes (processes indicated in FIG. 5A) performed by the first processing unit 503a in the main microcomputer 503, and a waveform (4) indicates transmission timing executed by the target-current-decision unit 503f synchronized with the execution timing indicated by the waveform (3).

A waveform (5) indicates the value of the first car-speed signal Vsp_ST1 that is a processing result of the first car-speed-input-processing unit 503c, a waveform (6) indicates the value of the first car-speed signal Vsp_ST2 that is a processing result of the second car-speed-input-processing unit 503d, a waveform (7) indicates the low-speed-judgment output F_A1 that is a processing result of the low-speed-judgment-processing unit 511a1, and a waveform (8) indicates the car-speed-comparison-judgment output F_A2 that is a processing result of the car-speed-comparison-judgment-processing unit 511a2.

A waveform (9) indicates the timer operation of the first timer-processing unit 511a3, a waveform (10) indicates the first timer output F_S1 of the first timer-processing unit 511a3, a waveform (11) indicates the initialization-judgment output F_A3 of the initialization-judgment-processing unit 511a4, a waveform (12) indicates the timer operation of the second timer-processing unit 511a5, a waveform (13) indicates the second timer output F_S2 of the second timer-processing unit 511a5, and a waveform (14) indicates the selection-logic output F_ILselect of the selection-logic-processing unit 511a6.

FIG. 12 indicates a state in a case where a car-speed value "5" [km/h] is normally received from the car-speed sensor 4, and the value of the low-speed-judgment output F_A1 indicated by the waveform (7) is "1". Moreover, the value of the second car-speed signal Vsp_ST2, which is indicated by the waveform (6), is alternately varied to the initial value FFh or the received car-speed value "5". Specifically, the value of the second car-speed signal Vsp_ST2 indicated by the waveform (6) is varied to "5" at a time period (A) by the process indicated in FIG. 6B, and to the initial value FFh at a time period (B) by the process indicated in FIG. 8. Moreover, because the state at the time period (B) is continued at a time period (C), the value of the second car-speed signal Vsp_ST2 is equal to the initial value FFh, and after the time periods (A) through (C), the value of the second car-speed signal Vsp_ST2 is repeated.

Therefore, at the time period (A), the value "5" of the first car-speed signal Vsp_ST1 is equal to the value "5" of second car-speed signal Vsp_ST2, so that the car-speed-comparison-judgment output F_A2, which is indicated by the waveform (8), outputted from the car-speed-comparison-judgment-processing unit 511a2 is presented by the following formula.

$F\_A2=0$

Moreover, at the time periods (B) through (C), the following formulas are established.

$Vsp\_ST1 \neq Vsp\_ST2$ $F\_A2=1$

After the time periods (A) through (C), the value ("1" or "0") of the car-speed-comparison-judgment output F_A2 is repeated.

Moreover, the first timer-processing unit 511a3 performs an increment operation at a time period (in a case where F_A2=1), and the car-speed-comparison-judgment output F_A2 is cleared as "0" at a time period (in a case where F_A2=0), whereby the first timer-processing unit 511a3 performs the operation as indicated by the waveform (9). A reception cycle "a" is 100 [millisecond], so that a value of a Timer 1 incremented by the first timer-processing unit 511a3 is not approached to 500 [millisecond], whereby the first timer output F_S1 is always "0".

In addition, it is repeated that the initial value FFh or the received value "5" is alternately set to the second car-speed signal Vsp_ST2, so that the initialization-judgment output F_A3, indicated by the waveform (11), of the initialization-judgment-processing unit 511a4 is set as "0" at a time period (Vsp_ST2=FFh), and the initialization-judgment output F_A3 is set as "1" at a time period (Vsp_ST2 FFh).

Moreover, the second timer-processing unit 511a5 performs a 0-clear operation at a time period (F_A3=0), and performs an increment operation at a time period (F_A3=1), whereby the second timer-processing unit 511a5 performs an operation indicated by the waveform (11). A communication cycle "b" between the main microcomputer 503 and the sub-microcomputer 511 is 1 [millisecond], so that a value of Timer 2 incremented by the second timer-processing unit 511a5 is not approached to 500 [millisecond], whereby the second timer output F_S2 is always "0".

Moreover, inputs of the selection-logic-processing unit 511a6 are presented by the following formulas.

$F\_A1=1$ $F\_S1=0$ $F\_S2=0$

Therefore, the selection-processing output of the selection-logic-processing unit 511a6 is presented by the following formula as indicated in the above-described Table 1.

$F\_ILselect=1$

As a result of the above-described formulas, a characteristic of the current threshold is presented by the characteristic indicated in FIG. 11B.

In order to enable an automatic parking-control, the characteristic indicated in FIG. 11B is defined in such a way that the motor current, which is lower than 50 [A], can be passed through positions near the middle of the torque (within ±3 [Nm]), so that the automatic parking-control can be performed in a low car-speed range.

Figure 13:
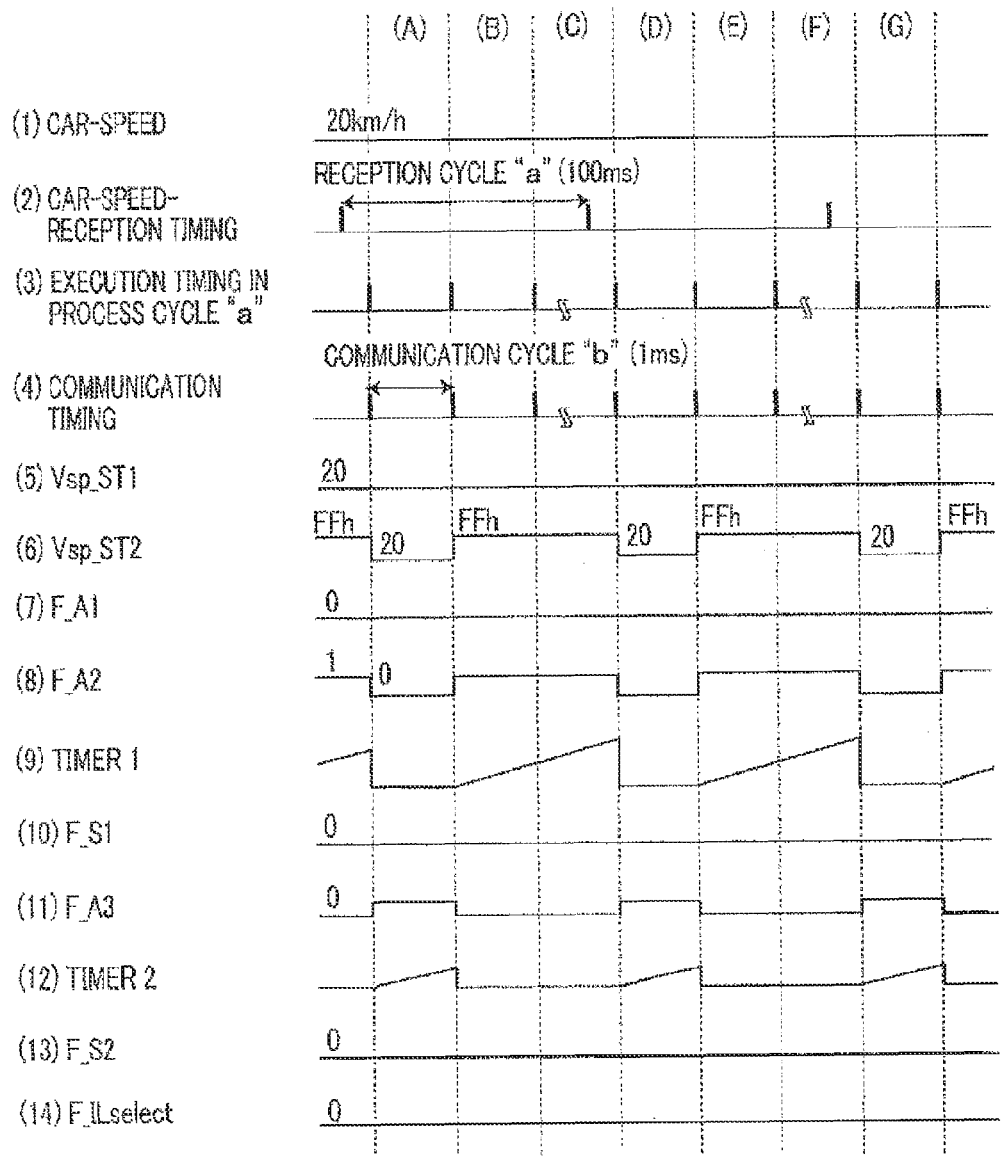
FIG. 13 is a timing chart illustrating an operation, in a state where the main control device is normally operated and a car speed is not low, of the control system and the electric power steering control device according to Embodiment 1 of the present invention.

Hereinafter, operations of the system, in a case where a car is driven at a velocity of 20 [km/h], will be explained. FIG. 13 is a timing chart illustrating an operation, in a state where the main control device is normally operated and a car speed is not low, of the control system and the electric power steering control device according to Embodiment 1 of the present invention. The car-speed 20 [km/h] in FIG. 13 is varied with respect to the car-speed 5 [km/h] in FIG. 12. The waveforms (1) through (14) in FIG. 13 respectively correspond to the waveforms (1) through (14) in FIG. 12.

The car-speed 20 [km/h] indicated by the waveform (1) in FIG. 13 is varied with respect to the car-speed 5 [km/h] indicated by the waveform (1) in FIG. 12. Moreover, the value of the first car-speed signal Vsp_ST1 indicated by the waveform (5) is varied from "5" to "20", and the value of the second car-speed signal Vsp_ST2, at the time period (A), indicated by the waveform (6) is varied from "5" to "20".

In addition, because the value of the car-speed is varied from "5" to "20", the value of the low-speed-judgment output F_A1 indicated by the waveform (7) is varied from "1" to "0". As a result of this variation, the value of the selection-logic output F_ILselect indicated by the waveform (14) is varied from "1" to "0". The other values indicated in FIG. 13 are equal to the values indicated in FIG. 12.

As described above, when the car is driven at a velocity of more than equal to 20 [km/h], the value of the low-speed-judgment output F_A1 indicated by the waveform (7) is set as "0", whereby the value of the selection-logic output F_ILselect used as the final output is set as "0", and the characteristic of the current threshold is indicated in FIG. 11A. The characteristic indicated in FIG. 11A is defined in such a way that the automatic parking control is limited, whereas the power steering control is not limited. At the velocity of more than equal to 20 [km/h], the automatic parking control is not performed, and only the power steering control is performed, so that the power steering control can be normally performed in accordance with the characteristic indicated in FIG. 11A.

Figure 14:
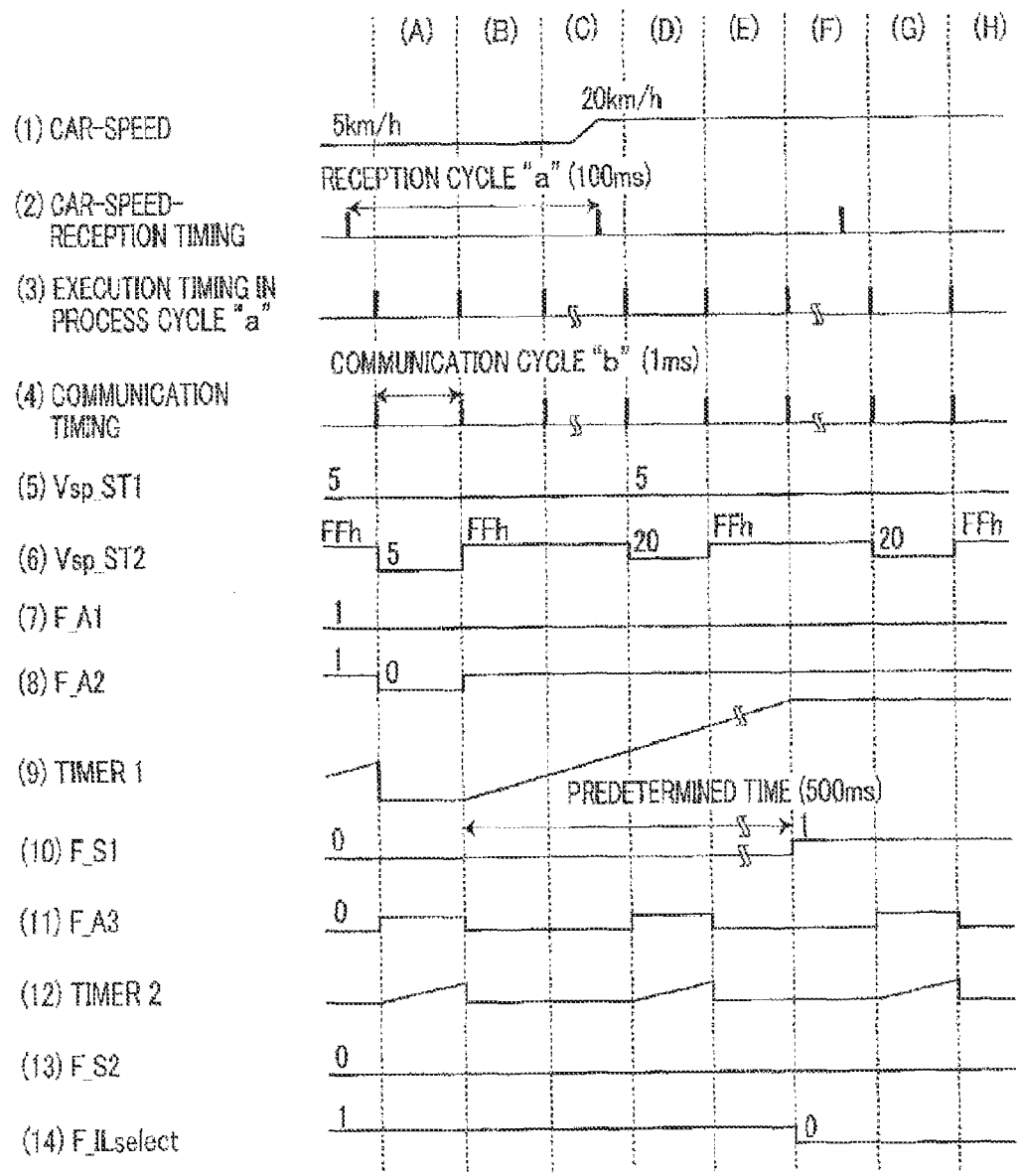
FIG. 14 is a timing chart illustrating an operation, in a state where the first signal-processing unit is stopped, of the control system and the electric power steering control device according to Embodiment 1 of the present invention.

Hereinafter, operations of the system, in a case where the first car-speed-input-processing unit 503c used as a first signal-processing unit is stopped, will be explained. FIG. 14 is a timing chart illustrating an operation, in a state where the first signal-processing unit is stopped, of the control system and the electric power steering control device according to Embodiment 1 of the present invention. The waveforms (1) through (14) in FIG. 14 respectively correspond to the waveforms (1) through (14) in FIG. 12.

At the time periods (A) and (B) in FIG. 14, a state is indicated in which the first car-speed-input-processing unit 503c is normally operated, whereas after the period (C), another state is indicated in which the first car-speed-input-processing unit 503c is stopped. At the time periods (A) and (B), the first car-speed-input-processing unit 503c is normally operated, so that the values, which are indicated in in FIG. 14, are equal to the values indicated in in FIG. 12. At the time period (C) in FIG. 14, although the car-speed indicated the waveform (1) is varied from 5 [km/h] to 20 [km/h], the first car-speed-input-processing unit 503c is stopped, whereby the value "5" of the first car-speed signal Vsp_ST1 indicated by the waveform (5) is continued. After the time period (C), the second car-speed-input-processing unit 503d is normally operated, so that the value of the second car-speed signal Vsp_ST2, which is indicated by the waveform (6), is alternately varied to the initial value FFh or the value "20".

At the time periods (B), (C), (E), (F), and (H), in which the value of the second car-speed signal Vsp_ST2 is initialized, as well as at the time periods (D) and (G), in which the second car-speed-input-processing unit 503d is executed, the following formula is established.

Vsp_ST1≠Vsp_ST2

Therefore, after the time period (B), the car-speed-comparison-judgment-processing unit 511a2 sets the value of the car-speed-comparison-judgment output F_A2 as the following formula.

F_A2=1

Moreover, the first timer-processing unit 511a3 continues the increment process for the Timer 1 indicated by the waveform (9). Furthermore, when a predetermined time (500 [millisecond]) elapses after the increment process of the first timer-processing unit 511a3 is started, "1" is set to the first timer output F_S1 as indicated on the waveform (10).

By the above-described operations, as indicated on the waveform (14), the selection-logic output F_ILselect of the selection-logic-processing unit 511a6 is presented by the following formula until the time period (E).

F_ILselect=1

After the time period (F), the following formulas are established.

F_S1=1, whereby F_ILselect=0

When the first car-speed-input-processing unit 503c is stopped, the above-described operations are performed, so that the characteristic of the current threshold is established as indicated in FIG. 11B at the time periods (A) and (B), in which the first car-speed-input-processing unit 503c is normally operated, as well as at the time periods (C) through (E), in which the first car-speed-input-processing unit 503c is stopped and the value of the Timer 1, which is incremented by the first timer-processing unit 511a3, reaches the predetermined value 500 [millisecond]. After time period (F), the characteristic of the current threshold is established as indicated in FIG. 11A.

In the characteristic indicated in FIG. 11A, the current threshold, by which safety can be ensured at a running, is established, so that the motor control is limited by the sub-microcomputer 511 via the AND circuit 508 indicated in FIG. 2 when an electric current, by which safety can't be ensured, is passed through (hatched areas illustrated in FIG. 11A) and a predetermined time (50 [millisecond]) elapses, in other words, the motor 6 is stopped.

Namely, when the value of the motor current Imd is indicated in the current-threshold area (in the hatched areas illustrated in FIG. 11A), "1" is substituted into the motor-current-judgment output F_S5 outputted from the motor-current-abnormality-judging unit 511b. Moreover, when the state is continued in a third predetermined time (for example, 50 [millisecond]), "1" is substituted into a third timer output F_S6, whereby "0" is substituted into the motor output DmtS. Furthermore, once "0" is substituted into the motor output DmtS, "0" of the motor output DmtS is maintained until the electric power of the EPS-ECU is turned off. As a result of the operations, "0" is substituted into the output of the AND circuit 508 indicated in FIG. 2, whereby the motor 6 is stopped, and safety is ensured.

Figure 15:
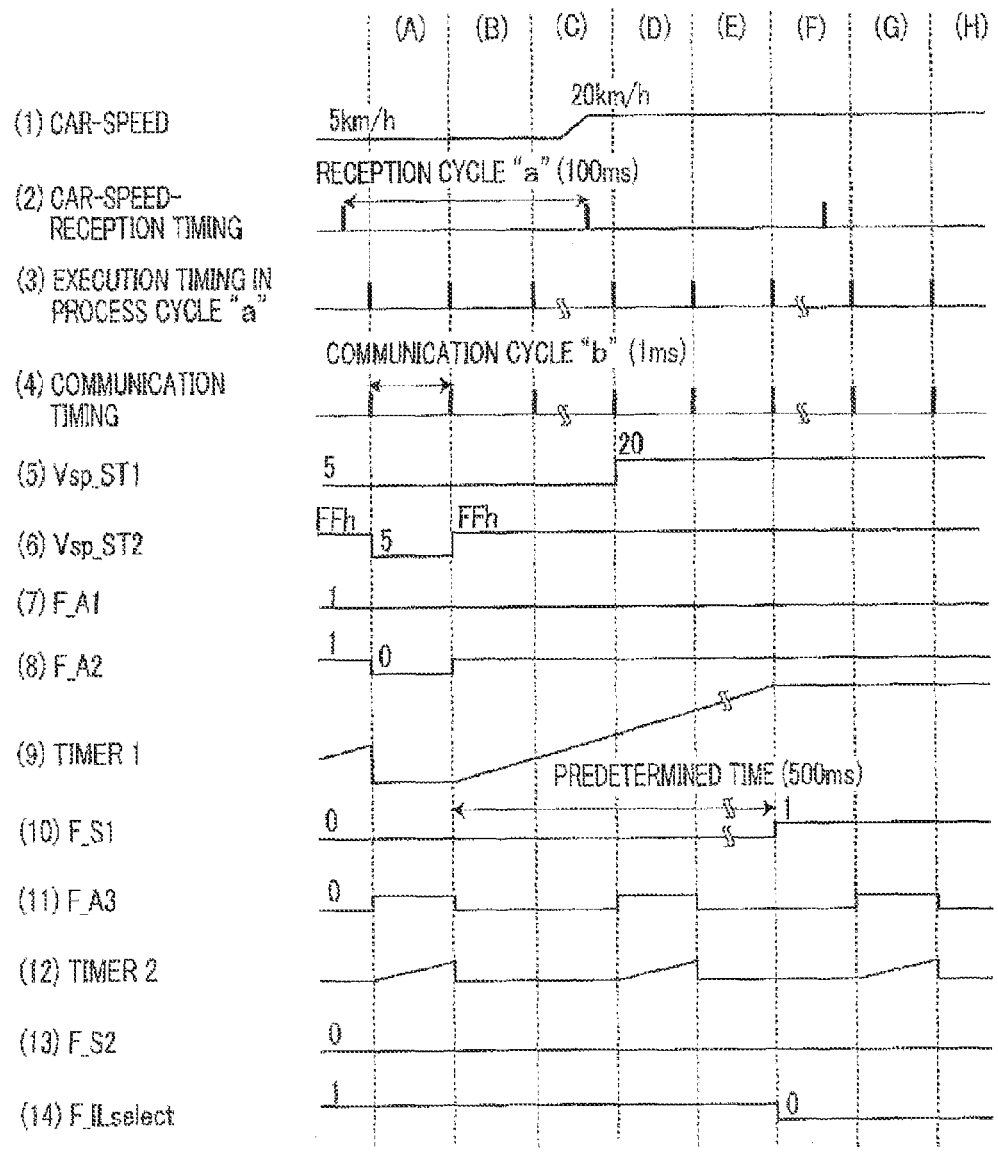
FIG. 15 is a timing chart illustrating an operation, in a state where the second signal-processing unit is stopped, of the control system and the electric power steering control device according to Embodiment 1 of the present invention.

Hereinafter, operations opposing the above-described operations indicated in FIG. 14 will be explained, in a case where the second car-speed-input-processing unit 503d used as a second signal-processing unit is stopped. FIG. 15 is a timing chart illustrating an operation, in a state where the second signal-processing unit is stopped, of the control system and the electric power steering control device according to Embodiment 1 of the present invention. The waveforms (1) through (14) in FIG. 15 respectively correspond to the waveforms (1) through (14) in FIG. 12.

At the time periods (A) and (B) in FIG. 15, a state is indicated, in which the second car-speed-input-processing unit 503d is normally operated, whereas after the period (C), another state is indicated, in which the second car-speed-input-processing unit 503d is stopped. At the time periods (A) and (B), the second car-speed-input-processing unit 503d is normally operated, so that the values indicated in in FIG. 14 are equal to the values indicated in in FIG. 12. At the time period (C) in FIG. 14, the car-speed is varied from 5 [km/h] to 20 [km/h]. After the time period (D), the first car-speed-input-processing unit 503c is normally operated, so that the value "20" of the first car-speed signal Vsp_ST1, which is indicated by the waveform (5), is continued. After the time period (C), the second car-speed-input-processing unit 503d is normally operated, so that the initial value FFh of the second car-speed signal Vsp_ST2, which is indicated by the waveform (6), is continued.

After the time period (B), the following formula is established.

$$Vsp\_ST1 \neq Vsp\_ST2$$

Therefore, after the time period (B), the car-speed-comparison-judgment-processing unit 511a2 sets the value of the car-speed-comparison-judgment output F_A2 as the following formula.

$$F\_A2=1$$

Moreover, the first timer-processing unit 511a3 continues the increment process for the Timer 1. Furthermore, when a predetermined time (500 [millisecond]) elapses, "1" is set to the first timer output F_S1.

Because the system is operated as described above, the selection-logic output F_ILselect, used as the final output, of the selection-logic-processing unit 511a6 is presented by the following formula until the time period (E).

$$F\_ILselect=1$$

After the time period (F), the following formulas are established.

$$F\_S1=1, \text{ whereby } F\_ILselect=0$$

By the above-described operations, the characteristic of the current threshold is established as indicated in FIG. 11B at the time periods (A) and (B), in which the second car-speed-input-processing unit 503d is normally operated, as well as at the time periods (C) through (E), in which the second car-speed-input-processing unit 503d is stopped and the value of the Timer 1, which is incremented by the first timer-processing unit 511a3, reaches the predetermined value 500 [millisecond]. After time period (F), the characteristic of the current threshold is established as indicated in FIG. 11A.

In the characteristic indicated in FIG. 11A, the current threshold, by which safety can be ensured at a running, is established, so that the motor control is limited by the sub-microcomputer 511 via the AND circuit 508 indicated in FIG. 2 when an electric current, by which safety can't be ensured, is passed through (hatched areas illustrated in FIG. 11A) and a predetermined time (50 [millisecond]) elapses, in other words, the motor 6 is stopped.

Namely, when the value of the motor current Imd is indicated in the current-threshold area (in the hatched areas illustrated in FIG. 11A), "1" is substituted into the motor-current-judgment output F_S5 outputted from the motor-current-abnormality-judging unit 511b. Moreover, when the state is continued in a third predetermined time (for example, 50 [millisecond]), "1" is substituted into the third timer output F_S6, whereby "0" is substituted into the motor output DmtS. Furthermore, once "0" is substituted into the motor output DmtS, "0" of the motor output DmtS is maintained until the electric power of the EPS-ECU is turned off. As a result of the operations, "0" is substituted into the output of the AND circuit 508 indicated in FIG. 2, whereby the motor 6 is stopped, and safety is ensured.

In the above-described description, the operations, in a case where the first car-speed-input-processing unit 503c is stopped, are explained, and the operations, in a case where the second car-speed-input-processing unit 503d is stopped, are explained. When the first car-speed-input-processing unit 503c and the second car-speed-input-processing unit 503d are concurrently stopped, the first car-speed signal Vsp_ST1 and the second car-speed signal Vsp_ST2 are presented by the following formulas, and the system is operated in a similar way as described above.

$$Vsp\_ST1 \neq Vsp\_ST2$$

$$Vsp\_ST2=FFh$$

In the other case, when the first car-speed-input-processing unit 503c or the second car-speed-input-processing unit 503d is abnormally operated, and an abnormal value is substituted into the first car-speed signal Vsp_ST1 or the second car-speed signal Vsp_ST2, the system is operated in a similar way as described above.

Figure 16:
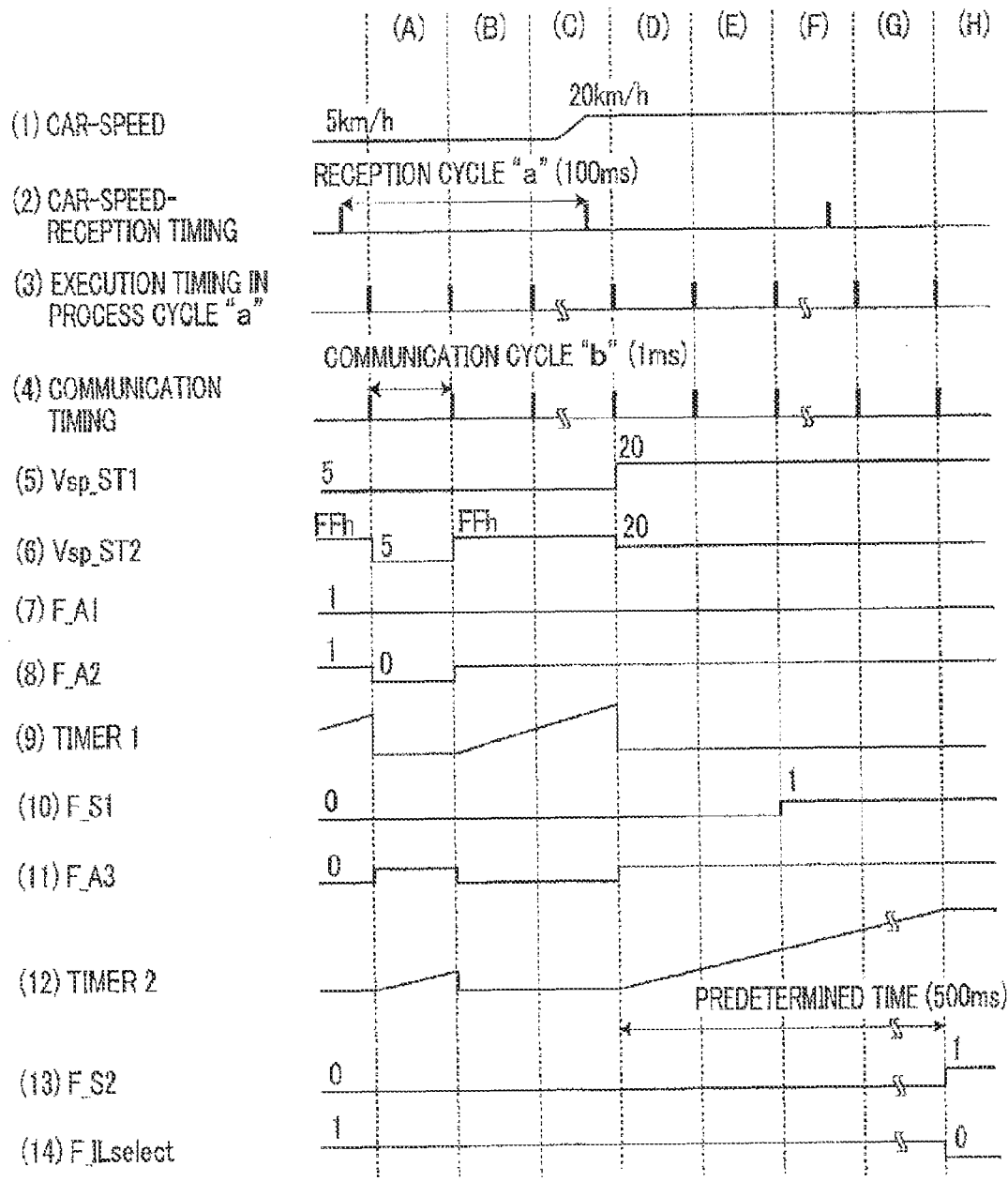
FIG. 16 is a timing chart illustrating an operation, in a state where an initialization processing unit is stopped, of the control system and the electric power steering control device according to Embodiment 1 of the present invention.

Hereinafter, a case of the operation (step S503 illustrated in FIG. 8), in which the initialization-processing unit is stopped, will be explained. FIG. 16 is a timing chart illustrating an operation, in a state where the initialization-processing unit is stopped, of the control system and the electric power steering control device according to Embodiment 1 of the present invention. The waveforms (1) through (14) in FIG. 16 respectively correspond to the waveforms (1) through (14) in FIG. 12.

At the time periods (A) and (B) in FIG. 16, a case is indicated, in which the initialization-processing unit for initializing the second car-speed signal is normally operated, whereas after the time period (C), another case is indicated in which the initialization-processing unit is stopped. At the time periods (A) and (B), the initialization-processing unit for initializing the second car-speed signal is normally operated, so that the values indicated in in FIG. 16 are equal to the values indicated in in FIG. 12. At the time period (C) in FIG. 16, the car-speed is varied from 5 [km/h] to 20 [km/h].

The first car-speed-input-processing unit 503c and the second car-speed-input-processing unit 503d are normally operated, so that the car-speed is inputted at the time period (D), and the value "20" is substituted into the first car-speed signal Vsp_ST1 indicated by the waveform (5) and the second car-speed signal Vsp_ST2 indicated by the waveform (6). After that, under a normal circumstance (in a normal case) at the time period (E), the second car-speed-input-processing unit 503d is initialized, whereby the initial value FFh should be substituted into the second car-speed signal Vsp_ST2. However, the initialization-processing unit for initializing the second car-speed signal Vsp_ST2 is stopped, the second car-speed signal Vsp_ST2 is presented by the following formula after the time period (E).

$$Vsp\_ST2=20$$

Therefore, the value "1" is substituted into the initialization-judgment output F_A3, indicated in FIG. 16, of the initialization-judgment-processing unit 511a4, and the second timer-processing unit 511a5 continues the increment operation, and moreover, when the second timer-processing unit 511a5 continues the increment operation in a predetermined time (500 [millisecond]), the value "1" is substituted into the second timer output F_S2 of the election-logic-processing unit 511a6. As a result, the selection-logic output F_ILselect of the selection-logic-processing unit 511a6 is presented by the following formula at the time periods (A) through (G).

$$F\_ILselect=1$$

Moreover, the selection-logic output F_ILselect is presented by the following formula at the time period (H).

$$F\_ILselect=0$$

In accordance with the above-described operations, the current threshold has a characteristic indicated in FIG. 11B at the time periods (A) and (B), in which the initialization-processing unit is normally operated, and at the time periods (C) through (G), in which the initialization-processing unit is stopped and the second timer-processing unit 511a5 continues the increment operation in the predetermined time (500 [millisecond]). After the time period (H), the current threshold has a characteristic indicated in FIG. 11A.

As described above, in the characteristic indicated in FIG. 11A, the current threshold, by which safety can be ensured at a running, is established, so that the motor control is limited by the sub-microcomputer 511 via the AND circuit 508 indicated in FIG. 2 when an electric current, by which safety can't be ensured, is passed through (hatched areas illustrated in FIG. 11A) and a predetermined time (50 [millisecond]) elapses, in other words, the motor 6 is stopped.

Namely, when the value of the motor current Imd is indicated in the current-threshold area (in the hatched areas illustrated in FIG. 11A), "1" is substituted into the motor-current-judgment output F_S5 outputted from the motor-current-abnormality-judging unit 511b. Moreover, when the state is continued in a third predetermined time (for example, 50 [millisecond]), "1" is substituted into the third timer output F_S6, whereby "0" is substituted into the motor output DmtS. Furthermore, once "0" is substituted into the motor output DmtS, "0" of the motor output DmtS is maintained until the electric power of the EPS-ECU is turned off. As a result of the operations, "0" is substituted into the output of the AND circuit 508 indicated in FIG. 2, whereby the motor 6 is stopped, and safety is ensured.

The a control system and the electric power steering control device according to Embodiment 1 of the present invention are configured as described above, so that the abnormality of the car-speed-input-processing units can be detected, by the sub-microcomputer used as a sub-control device, in accordance with a car-speed signal that is inputted to only the main microcomputer used as a main control device. Moreover, the stopping of the car-speed-input-processing units can be detected.

Moreover, the stopping of the initialization-processing unit, by which the stopping of the car-speed-input-processing unit is detected, can be detected. Furthermore, the output of the main microcomputer can be limited in accordance with a result of detecting an abnormality by the sub-microcomputer, whereby safety of a car can be ensured.

Moreover, the car-speed-input-processing unit of the main microcomputer can be checked without directly inputting a car-speed signal to the sub-microcomputer, so that it is not needed that a car-speed-inputting circuit (corresponding to the second interface circuit 502 according to Embodiment 1) is provided, whereby a cheap system can be realized.

Moreover, when a process of the first signal-processing unit or the second signal-processing unit is stopped, the last inputted signal is kept in the stopped unit, so that a first signal is not equal to a second signal, and an abnormality can be detected by the above-described comparison-judgment process.

Furthermore, when both processes of the first signal-processing unit and the second signal-processing unit are stopped, the last received signal is kept. In this case, when the same values are kept, the comparison-judgment unit can't detect an abnormality. However, the second signal is periodically initialized, so that the first signal is not equal to the second signal, and the abnormality can be detected by the comparison-judgment units. The second comparison-judgment unit is stopped. Therefore, once the second signal is initialized, the initialized value is kept, and the state, in which the first signal is not equal to the second signal, is continued.

After the first signal and the second signal are transmitted from the main control unit to the sub-control unit, the second signal is initialized, and a second signal-processing cycle is more extended with respect to a communication cycle from the main control unit to the sub-control unit, whereby an inputted second signal and the initialized second signal are transmitted to the sub-control unit, so that the sub-control unit can certainly performs a comparison-judgment process and an initialization-judgment process.

In addition, the first signal, which is used for a control being originally performed by the main control unit, is not initialized, whereas the second signal, which is not used for the control, is initialized, so that the control being originally performed by the main control unit is not affected. Moreover, the steering control device is configured by focusing to the first signal-processing unit and second signal-processing unit, whereby an abnormality of the car-speed-signal process executed by the main control unit can be usually detected by the sub-control unit.

Moreover, for example, when an automatic parking control, which functions at a very low speed, is performed, the motor-current threshold is expanded, the automatic parking control is enabled, the motor-current threshold is set at a value, by which the safety at the running can be ensured, when the automatic parking control is not performed, and the motor-current threshold is set at a value, by which the safety at the running can be ensured, when an abnormality occurs for the car-speed-input process in the main control unit, whereby the automatic parking control and the power steering control can be performed while the safety is ensured.

In general, when a main control device is monitored by a sub-control device, there is a method in which a similar process in the main control device is performed in the sub-control device, and an abnormality of the main control device is judged by comparing the result of the processes. However, in this case, it is required that an equivalent process capability of the main control device is provided in the sub-control device. In Embodiment 1 of the present invention, dual process, such as the first car-speed process and the second car-speed process, are performed in the main control device, and only a comparison judgment for a result of the process, so that a sub-control device, in which a process capability is lower than that of the main control device, can be used, and a cost of the sub-control device is more advantageous.

Furthermore, when an abnormality detection (check sum, or rolling counter), which is conventionally and generally used, at receiving CAN message, is concurrently used, the abnormality-detection capability of the system can be more increased.

In addition, although a case of the process for the car-speed input is described in Embodiment 1 of the present invention, the system may be used for another abnormality-detection process, for example, an automatic parking-control-signal process, an input process, or output process.

Moreover, in recent years, although power steering systems, which are controlled based on information, inputted via an in-car LAN, for an automatic parking control or the like, have been used, a cheap power steering device can be provided for these systems.

Embodiment 2

Hereinafter, a control system and the electric power steering control device according to Embodiment 2 of the present invention will be explained. In Embodiment 2 with respect to Embodiment 1, the control block diagram of the main microcomputer illustrated in FIG. 3 is modified to a control block diagram in FIG. 17, the process in the inter-microcomputers communication-processing unit illustrated in FIG. 8 is modified to an inter-microcomputers communication-processing unit illustrated in FIG. 18, the control-block diagram of the sub-microcomputer illustrated in FIG. 9 is modified to a control-block diagram illustrated in FIG. 19, and the block diagram of the motor-current-threshold-selection process illustrated in FIG. 10 is modified to a block diagram illustrated in FIG. 20. In the following explanations, the modifications will be mainly explained.

Figure 17:
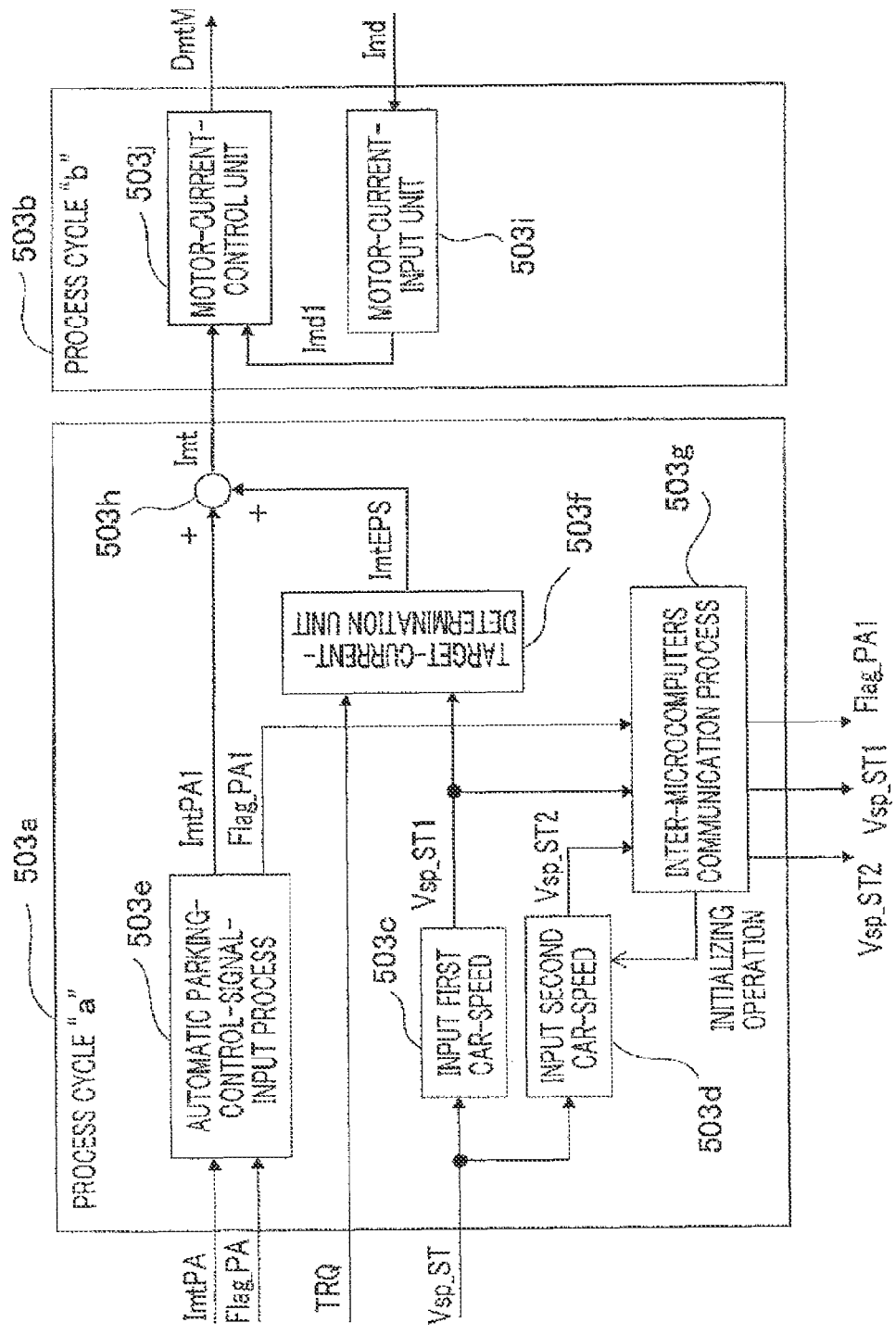
FIG. 17 is a control block diagram of a main control device in a control system and an electric power steering control device according to Embodiment 2 of the present invention.

Firstly, a configuration of a main microcomputer 503 will be explained. FIG. 17 is a control block diagram of a main control device in a control system and an electric power steering control device according to Embodiment 2 of the present invention. In FIG. 17, an automatic parking-control-signal-input-processing unit 503e generates an automatic parking control-command flag Flag_PA1 and an automatic parking-control-target current ImtPA1 in accordance with an automatic parking-control signal 11 inputted from CANBUS via the second interface circuit (refer to FIG. 2).

An inter-microcomputers communication-processing unit 503g transmits a first car-speed signal Vsp_ST1 generated by a first car-speed-input-processing unit 503c and a second car-speed signal Vsp_ST2 generated by a second car-speed-input-processing unit 503d, and the automatic parking control-command flag Flag_PA1 to a sub-microcomputer 511. The other processes in FIG. 17 are same as those in Embodiment 1, so that an explanation for the other processes is omitted.

Figure 18:
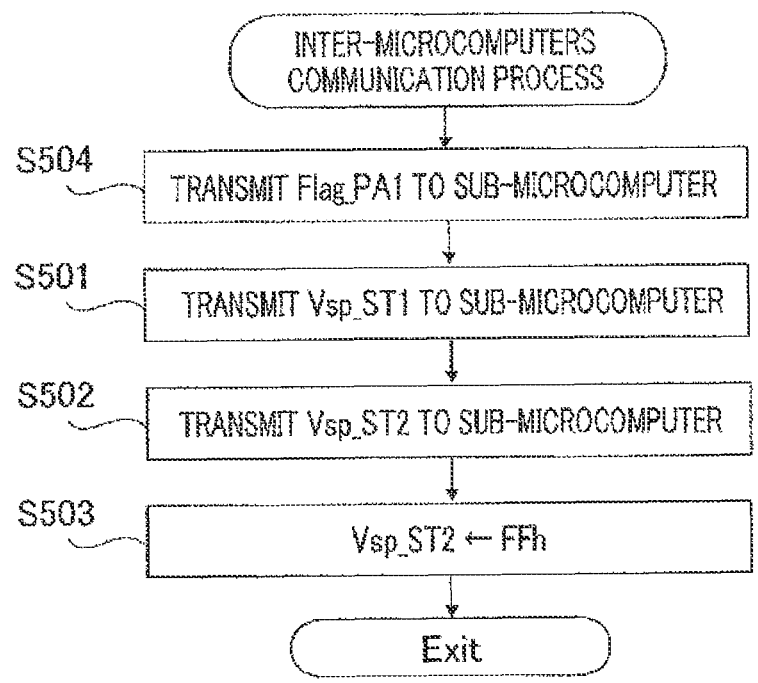
FIG. 18 is a flowchart illustrating a process of a communication-processing unit in the control system and the electric power steering control device according to Embodiment 2 of the present invention.

Secondly, operations of the inter-microcomputers communication-processing unit 503g will be explained. FIG. 18 is a flowchart illustrating a process of a communication-processing unit in the control system and the electric power steering control device according to Embodiment 2 of the present invention. In FIG. 18, at step S504, the automatic parking control-command flag Flag_PA1 generated by the automatic parking-control-signal-input-processing unit 503e is transmitted to the sub-microcomputer 511. The other processes in FIG. 18 are same as those in Embodiment 1, so that an explanation for the other processes is omitted.

Figure 19:
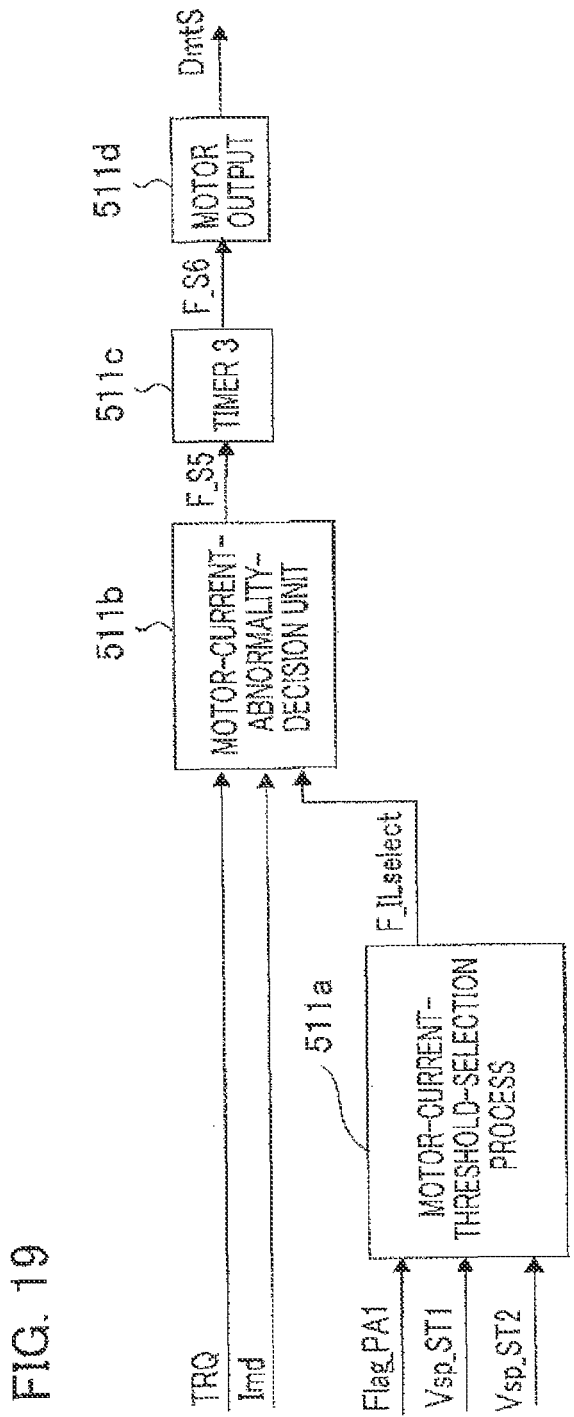
FIG. 19 is a control-block diagram of a sub-control unit in the control system and the electric power steering control device according to Embodiment 2 of the present invention.

Thirdly, a configuration of the sub-microcomputer 511 will be explained. FIG. 19 is a control-block diagram of a sub-control unit in the control system and the electric power steering control device according to Embodiment 2 of the present invention. In FIG. 19, a motor-current-threshold-selection-processing unit 511a inputs the automatic parking control-command flag Flag_PA1, the first car-speed signal Vsp_ST1, and the second car-speed signal Vsp_ST2, which are transmitted from the main microcomputer 503, whereby the motor-current-threshold-selection-processing unit 511a determines a motor-current threshold. The other processes in FIG. 19 are same as those in Embodiment 1, so that an explanation for the other processes is omitted.

Figure 20:
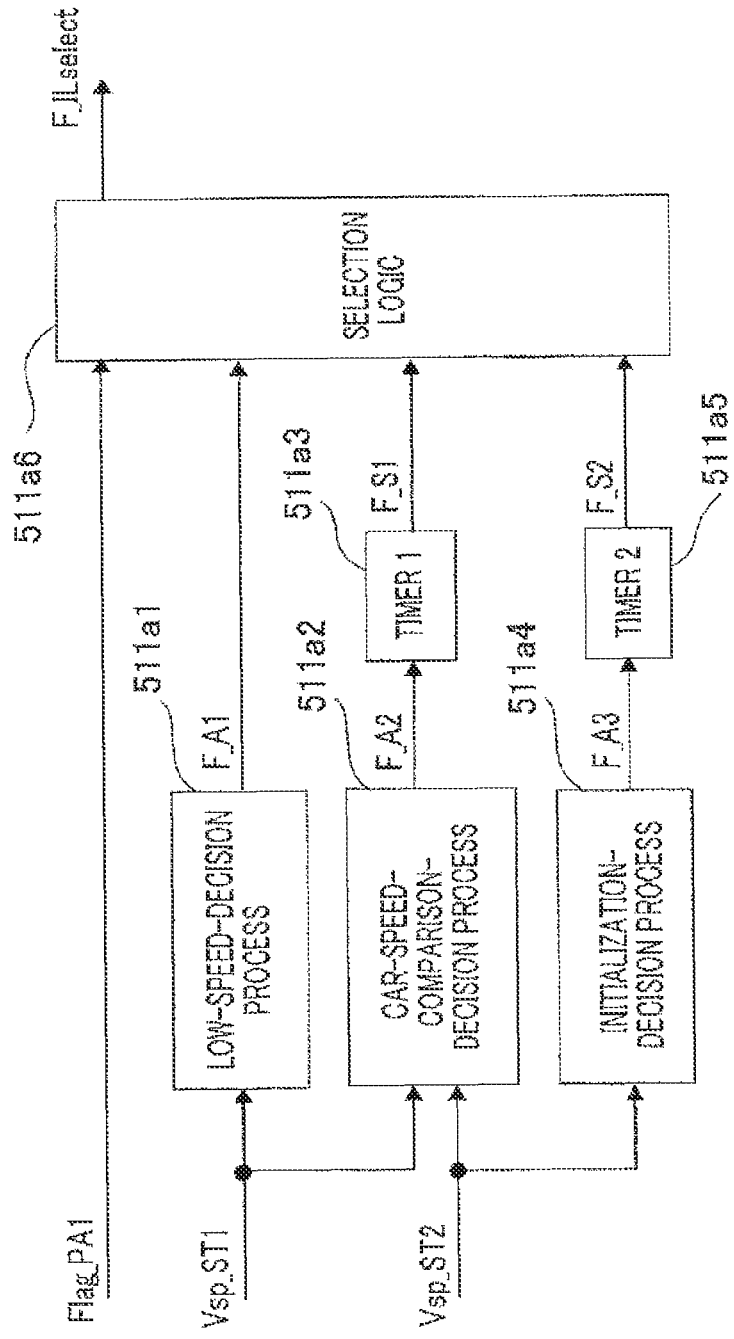
FIG. 20 is a control-block diagram of a motor-current-threshold-selection-processing unit in the control system and the electric power steering control device according to Embodiment 2 of the present invention.

Fourthly, operations of a motor-current-threshold-selection-processing unit 511a will be explained. FIG. 20 is a control-block diagram of a motor-current-threshold-selection-processing unit in the control system and the electric power steering control device according to Embodiment 2 of the present invention. An internal configuration of the motor-current-threshold-selection-processing unit 511a, which is illustrated in FIG. 19, is indicated in FIG. 20.

In FIG. 20, a selection-logic-processing unit 511a6 generates a selection-logic output F_ILselect, based on a truth table in the following Table 3, in accordance with the automatic parking control-command flag Flag_PA1, a low-input-processing input-processing output F_A1 of a low-speed-judgment-processing unit 511a1, a first timer output F_S1 of a first timer-processing unit 511a3, and a second timer output F_S2 of a second timer-processing unit 511a5. The automatic parking control-command flag Flag_PA1 is added in the following Table 3 with respect to Table 1 in Embodiment 1. The other processes in FIG. 20 are same as those in Embodiment 1, so that an explanation for the other processes is omitted.

TABLE 3

| Flag_PA1 | F_A1 | F_S1 | F_S2 | F_ILselect |
|---|---|---|---|---|
| 0 | 1 | 0 | 0 | 0 |
| 1 | | | | 1 |
| — | 0 | | | 0 |
| — | — | 1 | | 0 |
| — | — | — | 1 | 0 |

In the Table 3, it is indicated that "—" is not involved in the generation of the selection-logic output.

Figure 21:
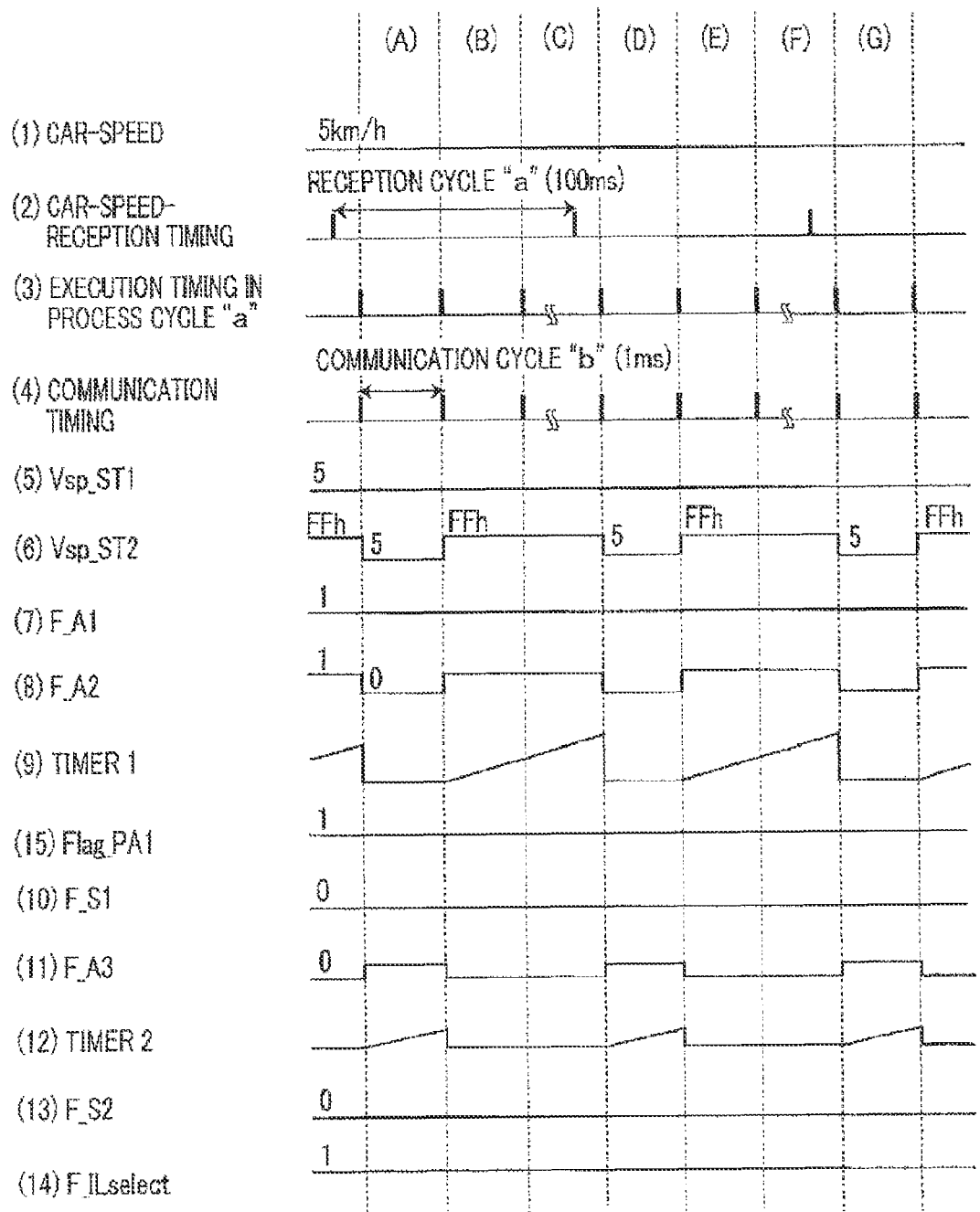
FIG. 21 is a timing chart illustrating an operation, in a state where the main control device is normally operated, and a car speed is lower than a predefined value, and moreover, an automatic parking control instruction flag is set as an on state, of the control system and the electric power steering control device according to Embodiment 2 of the present invention.

Because motor-current-threshold-selection-processing unit 511a is configured as described above, operations are performed as a timing char indicated in FIG. 21, in a case where a judgment result of a car-speed-comparison-judgment-processing unit 511a2 is normal (in a case where F_S1=0), a judgment result of an initialization-judgment-processing unit 511a4 is normal (in a case where F_S2=0), a first car-speed signal is lower than a predetermined value (in a case where F_A1=1), and the automatic parking control-command flag Flag_PA1 is turn on (in a case where Flag_PA1=1).

In other words, FIG. 21 is a timing chart illustrating an operation, in a state where the main control device is normally operated, and a car speed is lower than a predefined value, and moreover, an automatic parking control instruction flag is set as an on state, of the control system and the electric power steering control device according to Embodiment 2 of the present invention. In FIG. 21, a waveform (15) indicates the automatic parking control-command flag Flag_PA1 as a result of the automatic parking control-input process. The other waveforms in FIG. 21 are same as those in FIG. 12 according to Embodiment 1, so that an explanation for the other waveforms in FIG. 21 is omitted.

In FIG. 21 according to Embodiment 2, the system is kept in a state where the automatic parking control-command flag Flag_PA1 is turned on, whereby "1" is set to the value of the automatic parking control-command flag Flag_PA1, as indicated by the waveform (15), which is generated by the automatic parking control-input process. Meanwhile, a value "5" of the car-speed is normally received, so that "1" is set to the output F_A1, indicated on the waveform (7), of the low-speed-judgment-processing unit 511a1, "0" is set to the output F_S1, indicated by the waveform (10), of the first timer-processing unit 511a3, which is set based on the output F_A2 of the car-speed-comparison-judgment-processing unit 511a2, and "0" is set to the output F_S2, indicated by the waveform (13), of the second timer-processing unit 511a5, which is set based on the output F_A3 of the initialization-judgment-processing unit 511a4.

As a result, "1" is set to the selection-logic output F_ILselect of the selection-logic-processing unit 511a6, and a characteristic indicated in FIG. 11b is selected for the characteristic of the current threshold. The characteristic of the current threshold, which is indicated in FIG. 11b, is defined in such a way that the automatic parking control is not prevented as described above, so that the automatic parking control can be performed.

Figure 22:
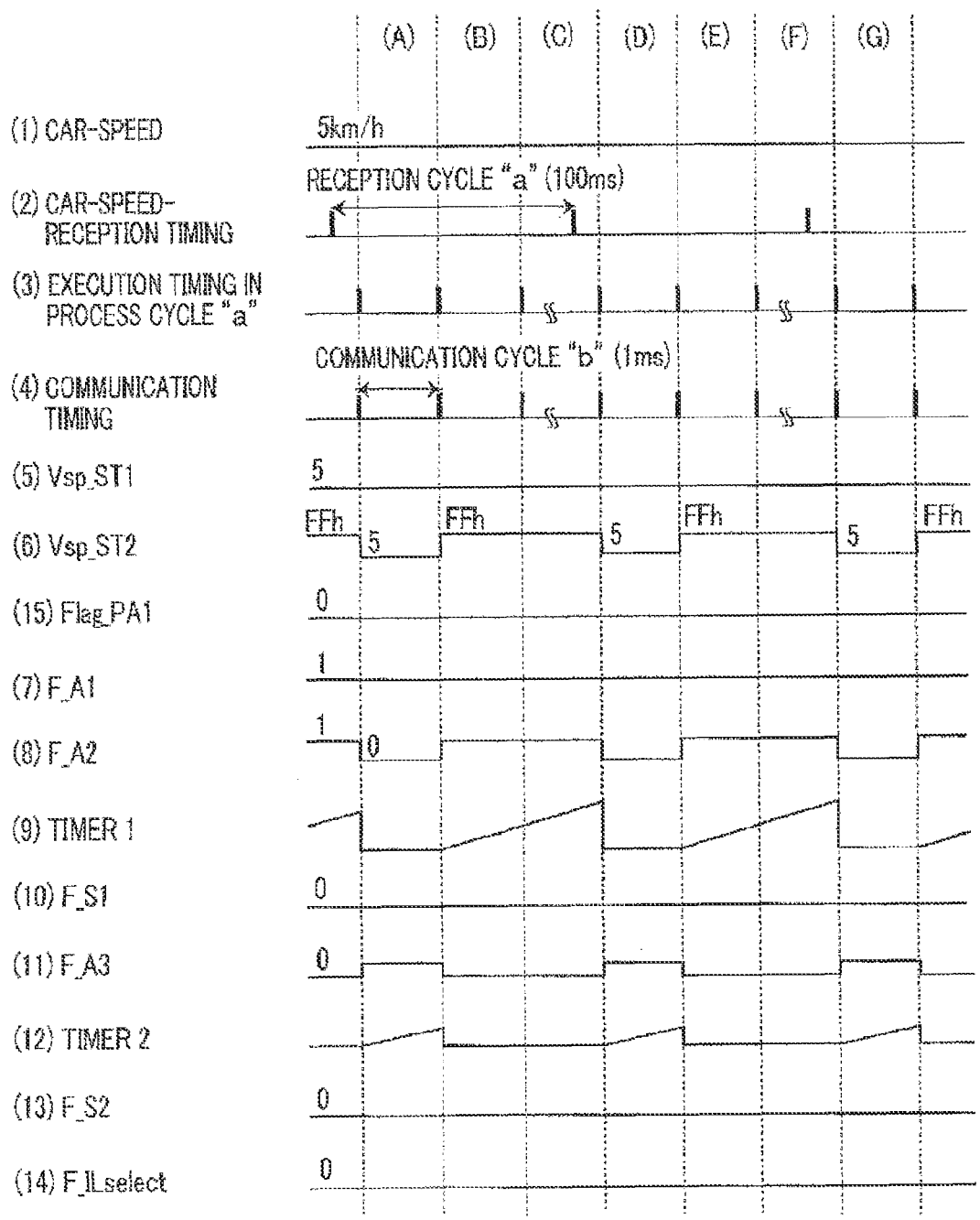
FIG. 22 is a timing chart illustrating an operation, in a state where the main control device is normally operated, and the car speed is lower than the predefined value, and moreover, the automatic parking control instruction flag is set as an off state, of the control system and the electric power steering control device according to Embodiment 2 of the present invention.

Hereinafter, operations will be explained, in a case where the automatic parking control-command flag Flag_PA1 is turned off (in a case where Flag_PA1=0), with respect to the above-described operations in a case where the automatic parking control-command flag Flag_PA1 is turned on. FIG. 22 is a timing chart illustrating an operation, in a state where the main control device is normally operated, and the car speed is lower than the predefined value, and moreover, the automatic parking control instruction flag is set as an off state, of the control system and the electric power steering control device according to Embodiment 2 of the present invention.

In FIG. 22 with respect to FIG. 21, the automatic parking control-command flag Flag_PA1 is varied from "on" to "off". In particular, the value of the automatic parking control-command flag Flag_PA1, indicated by the waveform (15) in FIG. 22 with respect to FIG. 21, is varied from "1" to "0". As a result, the value of the selection-logic output F_ILselect, indicated by the waveform (14), is varied from "1" to "0". The other waveforms in FIG. 22 are same as those in FIG. 21.

As described above, when the automatic parking control-command flag Flag_PA1 is turned off, the value of the automatic parking control-command flag Flag_PA1 is varied from "1" to "0", whereby the selection-logic output F_ILselect used as the final output is varied from "1" to "0" (F_ILselect=0), and a characteristic of the current threshold is indicated in FIG. 11A. When the automatic parking control-command flag Flag_PA1 is turned off, the automatic parking control is not performed, and only the power steering control is executed. The characteristic indicated in FIG. 11A is defined in such a way that the power steering control is not prevented, so that the power steering control can be performed.

In addition, when the judgment result of the car-speed-comparison-judgment-processing unit 511a2 is abnormal, and the output F_S1 of the first timer-processing unit 511a3 is "1", or when the judgment result of the initialization-judgment-processing unit 511a4 is abnormal, and the output F_S2 of the second timer-processing unit 511a5 is "1", and the value of the first car-speed signal is greater than or equal to the predetermined value, and the output F_A1 of the low-speed-judgment-processing unit 511a1 is "0", the operations in Embodiment 2 are same as those in Embodiment 1, so that explanations are omitted.

Because the control system and the electric power steering control device according to Embodiment 2 is configured as described above, effects being equivalent to those in Embodiment 1 can be obtained. Moreover, when the automatic parking-control device turns on the automatic parking control-command flag in a low speed range (lower than 10 [km/h]) in a state where an automatic parking control is performed, the current threshold has a characteristic indicated in FIG. 11B. Furthermore, when the automatic parking control is not performed (when the automatic parking control-command flag is turned off), or a car is running (greater than or equal to 10 [km/h]), or the car-speed-comparison-judgment result is abnormal, or the initialization-judgment result is abnormal, the current threshold has a characteristic indicated in FIG. 11A. The characteristic indicated in FIG. 11A is defined in such a way that the power steering control is not prevented as well as safety is kept even when the car is running, and the characteristic indicated in FIG. 11B is defined in such a way that the automatic parking control is not prevented as well as safety is kept only when the car is running in a low speed range, so that safety as well as a control capacity can be realized.

INDUSTRIAL APPLICABILITY

The control system of the present invention can be applied to a control device in any field in which a controlled object is controlled by using a microcomputer or the like. Moreover, in the electric power steering control device of the present invention can be effectively applied to a control device in a particular car field.

What is claimed is:
1. A control system comprising:
a main control device that generates output for controlling a controlled object in accordance with an input signal;
a sub-control device for monitoring an operating state of the main control device;
a communication-processing unit for communicating between the main control device and the sub-control device;
a limitation unit for limiting the output of the main control device in accordance with the monitoring by the sub-control device; wherein
the main control device includes a first signal-processing unit that generates a first signal, which is used for generating the output, in accordance with the input signal, a second signal-processing unit that generates a second signal, which is substantially equivalent to the first signal, in accordance with the input signal, and an initialization-processing unit that periodically initializes the second signal,
the communication-processing unit has a function of transmitting the first signal and the second signal from the main control device to the sub-control device,
the sub-control device includes a comparison-judgment-processing unit that compares the first signal with the second signal, which are transmitted from the main control device via the communication-processing unit, and judges that an abnormality occurs when a state, in which a deviation between the both signals is greater than equal to a predetermined value, is continued in a time being longer than or equal to a first predetermined time, an initialization-judgment-processing unit that judges that an abnormality occurs when a state, in which the second signal is not initialized by the initialization-processing unit, is continued in a time being longer than or equal to a second predetermined time, and an abnormality-judg- ing unit that judges that an abnormality occurs when at least one of the comparison-judgment-processing unit and the initialization-judgment-processing unit judges that the abnormality occurs, and the limitation unit is configured in such a way that the limitation unit adds a predetermined limitation to the output of the main control device, when the abnormality-judging unit judges that the abnormality occurs; wherein the initialization-processing unit is configured in such a way that the initialization-processing unit initializes the second signal, after the communication-processing unit performs the transmission, and a process cycle of the second signal-processing unit is defined to be longer than an initialization cycle of the initialization-processing unit.

2. An electric power steering control device comprising:

a main control device that generates output for controlling a motor that generates a steering auxiliary torque corresponding to a steering torque applied by a driver;

a sub-control device for monitoring an operating state of the main control device;

a communication-processing unit for communicating between the main control device and the sub-control device;

a limitation unit for limiting the output of the main control device in accordance with the monitoring by the sub-control device;

a torque-detecting unit for detecting the steering torque applied by the driver; and a motor-current-detecting unit for detecting a motor current passed through the motor; wherein the main control device includes a first car-speed-signal-processing unit that generates a first car-speed signal in accordance with a car-speed signal inputted from a car-speed sensor (4), a second car-speed-signal-processing unit that generates a second car-speed signal, which is substantially equivalent to the first car-speed signal, in accordance with the car-speed signal, a target-current-determination unit that determines a target current of the motor in accordance with at least the detected steering torque and the first car-speed-signal, and a motor-current-control unit that generates output for controlling the motor current in accordance with the determined target current, the communication-processing unit has a function of transmitting the first signal and the second signal from the main control device to the sub-control device, the sub-control device includes a comparison-judgment-processing unit that compares the first signal with the second signal, which are transmitted from the main control device via the communication-processing unit, and judges that an abnormality occurs when a state, in which these signals are not equal to each other, is continued in a time being longer than or equal to a first predetermined time, a car-speed-judgment unit that judges that an abnormality occurs when the comparison-judgment-processing unit judges that the abnormality occurs, and a motor-current-abnormality-judging unit that judges that an abnormality occurs when a state, in which a current threshold is defined based on at least the detected steering torque, the first car-speed-signal, and a judgment result of the car-speed-judgment unit, and the detected motor-current value is greater than the current threshold, is continued in a time being longer than or equal to a third predetermined time, and the limitation unit is configured in such a way that the limitation unit adds a predetermined limitation to the output of the motor-current-control unit, when the motor-current-abnormality-judging unit judges that the abnormality occurs.

3. An electric power steering control device according to claim 2, wherein the current threshold is determined based on the detected steering torque, the first car-speed-signal, and a judgment result of the car-speed-judgment unit, and the current threshold is defined as a first current threshold when a judgment result by the car-speed-judgment unit is normal state, and the first car-speed signal is lower than a predetermined value, and defined as a second current threshold when the judgment result by the car-speed-judgment unit is abnormal state, or the first car-speed signal is greater than or equal to the predetermined value, and moreover, the second current threshold is lower than the first current threshold.

4. An electric power steering control device according to claim 2, further comprising:

an automatic parking-control unit that outputs an automatic parking-control current for performing automatic parking control and an automatic parking control-command flag, which is turned on when the automatic parking control is executed and turned off when the automatic parking control is stopped; and an current-addition unit that adds the automatic parking-control current to the motor-target current so as to generate a new target current; characterized in that the current threshold is determined based on the detected steering torque, the first car-speed signal, a judgment result by the car-speed-judgment unit, and the automatic parking control-command flag, and the current threshold is defined as a first current threshold when a judgment result by the car-speed-judgment unit is normal state, and the first car-speed signal is lower than a predetermined value, and moreover, the automatic parking control-command flag is turned on, and defined as a second current threshold when the judgment result by the car-speed-judgment unit is abnormal state, or the first car-speed signal is greater than or equal to the predetermined value, or the automatic parking control-command flag is turned off, and moreover, the second current threshold is lower than the first current threshold.

5. An electric power steering control device comprising:

a main control device that generates output for controlling a motor that generates a steering auxiliary torque corresponding to a steering torque applied by a driver;

a sub-control device for monitoring an operating state of the main control device;

a communication-processing unit for communicating between the main control device and the sub-control device;

a limitation unit for limiting the output of the main control device in accordance with the monitoring by the sub-control device;

a torque-detecting unit for detecting the steering torque applied by the driver; and a motor-current-detecting unit for detecting a motor current passed through the motor; wherein the main control device includes a first car-speed-signal-processing unit that generates a first car-speed signal in accordance with a car-speed signal inputted from a car-speed sensor, a second car-speed-signal-processing unit that generates a second car-speed signal, which is substantially equivalent to the first car-speed signal, in accordance with the car-speed signal, a target-current-determination unit that determines a target current of the motor in accordance with at least the detected steering torque and the first car-speed-signal, a motor-current-control unit that generates output for controlling the motor current in accordance with the determined target current, and an initialization-processing unit that periodically initializes the second signal, the communication-processing unit has a function of transmitting the first signal and the second signal from the main control device to the sub-control device, the sub-control device includes a comparison-judgment-processing unit that compares the first signal with the second signal, which are transmitted from the main control device (503) via the communication-processing unit, and judges that an abnormality occurs when a state, in which these signals are not equal to each other, is continued in a time being longer than or equal to a first predetermined time, an initialization-judgment-processing unit that judges that an abnormality occurs when a state, in which the second signal is not initialized by the initialization-processing unit, is continued in a time being longer than or equal to a second predetermined time, a car-speed-judgment unit that judges that an abnormality occurs when at least one of the comparison-judgment-processing unit and the initialization-judgment-processing unit judges that the abnormality occurs, and a motor-current-abnormality-judging unit that judges that an abnormality occurs when a state, in which a current threshold is defined based on at least the detected steering torque, the first car-speed-signal, and a judgment result of the car-speed-judgment unit, and the detected motor-current value is greater than the current threshold, is continued in a time being longer than or equal to a third predetermined time, and the limitation unit is configured in such a way that the limitation unit adds a predetermined limitation to the output of the motor-current-control unit, when the motor-current-abnormality-judging unit judges that the abnormality occurs.

* * * * *